US008113935B2

(12) United States Patent
Walker et al.

(10) Patent No.: US 8,113,935 B2

(45) Date of Patent: Feb. 14, 2012

(54) SYSTEM AND METHOD FOR PRESENTING PAYOUT RANGES AND AUDIOVISUAL CLIPS AT A GAMING DEVICE

(75) Inventors: Jay S. Walker, Ridgefield, CT (US); Michael W. Patterson, New York, NY (US); Robert C. Tedesco, Fairfield, CT (US); James A. Jorasch, New York, NY (US)

(73) Assignee: IGT, Reno, NV (US)

( * ) Notice: Subject to any disclaimer, the term of this patent is extended or adjusted under 35 U.S.C. 154(b) by 1373 days.

(21) Appl. No.: 11/684,718

(22) Filed: Mar. 12, 2007

(65) Prior Publication Data

US 2007/0167221 A1 Jul. 19, 2007

(51) Int. Cl.
*A63F 9/24* (2006.01)
*G06F 17/00* (2006.01)

(52) U.S. Cl. ................. 463/16; 463/20; 463/25; 463/30

(58) Field of Classification Search ......................... None
See application file for complete search history.

(56) References Cited

U.S. PATENT DOCUMENTS 3,810,627 A 5/1974 Levy
3,909,002 A 9/1975 Levy
4,375,286 A 3/1983 Seitz et al. ................ 273/121 A
4,553,748 A 11/1985 Allen et al. ................... 273/1 E
4,618,150 A 10/1986 Kimura ..................... 273/143 R
4,621,814 A 11/1986 Stepan et al. ............. 273/138 A
4,652,998 A 3/1987 Koza et al.
4,669,731 A 6/1987 Clarke
4,679,143 A 7/1987 Hagiwara
4,766,539 A 8/1988 Fox
4,799,683 A 1/1989 Bruner, Jr. ................ 273/138 A
4,826,169 A 5/1989 Bessho
4,839,743 A 6/1989 Best et al. ..................... 358/310
4,858,930 A 8/1989 Sato ............................ 273/85 G
4,926,327 A 5/1990 Sidley ........................... 364/412
5,127,651 A 7/1992 Okada ....................... 273/143 R
5,142,358 A 8/1992 Jason .............................. 358/93
5,166,502 A 11/1992 Rendleman et al. .......... 235/492
5,178,390 A 1/1993 Okada
5,179,517 A 1/1993 Sarbin et al.

(Continued)

FOREIGN PATENT DOCUMENTS

GB 2072395 A 9/1981

(Continued)

OTHER PUBLICATIONS

Marshall Fey, Slot Machines, 1983, First Edition, p. 162.

(Continued)

*Primary Examiner* — Paul A. D'Agostino

(74) *Attorney, Agent, or Firm* — K&L Gates LLP

(57) ABSTRACT

A gaming device presents a paytable with entries showing a range of outcome values. When the outcome displayed by the gaming device matches an entry on the paytable showing a range of outcome values, an audiovisual clip is played and the player is informed as to which precise value within the range of values is the actual outcome value. The particular audio-visual clip shown may provide an indication of where within the range the precise value lies by virtue of the particular clip's importance. The audiovisual clip is repurposed from its original purpose for use in the gaming device, and may be a clip from a movie, motion picture, television show, or the like.

47 Claims, 10 Drawing Sheets

U.S. PATENT DOCUMENTS

| | | | | |
|---|---|---|---|---|
| 5,237,157 | A | 8/1993 | Kaplan | 235/375 |
| 5,259,613 | A | 11/1993 | Marnell, II | 273/138 A |
| 5,320,356 | A | 6/1994 | Cuada | |
| 5,373,440 | A | 12/1994 | Cohen et al. | 364/410 |
| 5,393,061 | A | 2/1995 | Manship et al. | 273/143 R |
| 5,411,258 | A | 5/1995 | Wilson et al. | 273/86 B |
| 5,423,539 | A | 6/1995 | Nagao | 273/143 R |
| 5,429,361 | A | 7/1995 | Raven et al. | 273/138 A |
| 5,449,173 | A | 9/1995 | Thomas et al. | 273/143 R |
| 5,472,195 | A | 12/1995 | Takemoto et al. | 273/138 A |
| 5,483,444 | A | 1/1996 | Heintzeman et al. | |
| 5,488,411 | A | 1/1996 | Lewis | 348/8 |
| 5,494,287 | A | 2/1996 | Manz | 273/143 R |
| 5,508,731 | A | 4/1996 | Kohorn | 348/1 |
| 5,511,781 | A | 4/1996 | Wood et al. | |
| 5,513,846 | A | 5/1996 | Niederlein et al. | 273/143 R |
| 5,530,852 | A | 6/1996 | Meske, Jr. et al. | 395/600 |
| 5,542,669 | A | 8/1996 | Charron | |
| 5,550,561 | A | 8/1996 | Ziarno | 345/163 |
| 5,579,537 | A | 11/1996 | Takahisa | 455/66 |
| 5,590,197 | A | 12/1996 | Chen et al. | 380/24 |
| 5,592,212 | A | 1/1997 | Handelman | 348/12 |
| 5,592,375 | A | 1/1997 | Salmon et al. | 395/207 |
| 5,594,661 | A | 1/1997 | Bruner et al. | 364/514 R |
| 5,601,488 | A | 2/1997 | Kadlic | |
| D378,604 | S | 3/1997 | Brettschneider | D21/37 |
| 5,612,730 | A | 3/1997 | Lewis | 348/8 |
| 5,630,754 | A | 5/1997 | Rebane | 463/9 |
| 5,638,426 | A | 6/1997 | Lewis | 379/90 |
| 5,646,988 | A | 7/1997 | Hikawa | 379/266 |
| 5,651,548 | A | 7/1997 | French et al. | 273/309 |
| 5,655,961 | A | 8/1997 | Acres et al. | 463/27 |
| 5,664,998 | A | 9/1997 | Seelig et al. | 463/20 |
| 5,664,999 | A | 9/1997 | Kurihara | 463/20 |
| 5,674,128 | A | 10/1997 | Holch et al. | |
| 5,675,828 | A | 10/1997 | Stoel et al. | 395/825 |
| 5,676,375 | A | 10/1997 | Pirouzkhah | 273/288 |
| 5,695,402 | A | 12/1997 | Stupak | |
| 5,697,843 | A | 12/1997 | Manship et al. | 463/20 |
| 5,704,835 | A | 1/1998 | Dietz, II | |
| 5,720,662 | A | 2/1998 | Holmes, Jr. et al. | |
| 5,752,882 | A | 5/1998 | Acres et al. | 463/42 |
| 5,761,647 | A | 6/1998 | Boushy | 705/10 |
| 5,766,075 | A | 6/1998 | Cook et al. | |
| 5,770,533 | A | 6/1998 | Franchi | 463/42 |
| 5,775,992 | A | 7/1998 | Wood et al. | |
| 5,779,549 | A | 7/1998 | Walker et al. | 463/42 |
| 5,788,573 | A | 8/1998 | Baerlocher et al. | 463/16 |
| 5,816,918 | A | 10/1998 | Kelly et al. | |
| 5,820,459 | A | 10/1998 | Acres et al. | |
| 5,823,872 | A | 10/1998 | Prather et al. | 463/6 |
| 5,839,960 | A | 11/1998 | Parra et al. | 463/41 |
| 5,876,284 | A | 3/1999 | Acres et al. | |
| 5,902,184 | A | 5/1999 | Bennett | |
| 5,910,048 | A | 6/1999 | Feinberg | |
| 5,935,002 | A | 8/1999 | Falciglia | 463/19 |
| 5,941,769 | A | 8/1999 | Order | 463/12 |
| 5,947,820 | A | 9/1999 | Morro et al. | 463/9 |
| 5,967,896 | A | 10/1999 | Jorasch | |
| 5,971,271 | A | 10/1999 | Wynn et al. | 235/380 |
| 5,971,850 | A | 10/1999 | Liverance | |
| 5,971,851 | A | 10/1999 | Pascal et al. | 463/24 |
| 5,988,638 | A | 11/1999 | Rodesch | |
| 5,997,400 | A | 12/1999 | Seelig et al. | 463/6 |
| 6,021,949 | A | 2/2000 | Boiron | 235/492 |
| 6,033,307 | A | 3/2000 | Vancura | |
| 6,056,642 | A | 5/2000 | Bennett | |
| 6,080,063 | A | 6/2000 | Khosla | 463/42 |
| 6,086,066 | A | 7/2000 | Takeuchi et al. | |
| 6,089,977 | A | 7/2000 | Bennett | |
| 6,095,921 | A | 8/2000 | Walker et al. | 463/20 |
| 6,110,041 | A | 8/2000 | Walker et al. | 463/20 |
| 6,113,493 | A | 9/2000 | Walker et al. | |
| 6,113,495 | A | 9/2000 | Walker et al. | 463/42 |
| 6,135,885 | A | 10/2000 | Lermusiaux | 463/20 |
| 6,139,431 | A | 10/2000 | Walker et al. | |
| 6,142,872 | A | 11/2000 | Walker et al. | |
| 6,146,276 | A | 11/2000 | Okuniewicz | 463/35 |
| 6,176,781 | B1 | 1/2001 | Walker et al. | |
| 6,186,893 | B1 | 2/2001 | Walker et al. | 463/20 |
| 6,190,254 | B1 | 2/2001 | Bennett | |
| 6,190,256 | B1 | 2/2001 | Walker et al. | 463/25 |
| 6,193,610 | B1 | 2/2001 | Junkin | 463/40 |
| 6,210,275 | B1 | 4/2001 | Olsen | 463/16 |
| 6,224,486 | B1 | 5/2001 | Walker et al. | 463/42 |
| 6,234,896 | B1 | 5/2001 | Walker et al. | 463/16 |
| 6,251,013 | B1 | 6/2001 | Bennett | |
| 6,254,482 | B1 | 7/2001 | Walker et al. | |
| 6,296,190 | B1 | 10/2001 | Rendleman | 235/492 |
| 6,302,790 | B1 | 10/2001 | Brossard | 463/20 |
| 6,319,123 | B1 * | 11/2001 | Paludi | 463/20 |
| 6,319,125 | B1 | 11/2001 | Acres | |
| 6,343,989 | B1 | 2/2002 | Wood et al. | |
| 6,375,187 | B1 | 4/2002 | Baerlocher | |
| 6,375,568 | B1 | 4/2002 | Roffman et al. | 463/26 |
| 6,375,570 | B1 | 4/2002 | Poole | 463/31 |
| 6,390,917 | B1 | 5/2002 | Walker et al. | 463/20 |
| 6,406,369 | B1 | 6/2002 | Baerlocher et al. | 463/20 |
| 6,464,584 | B2 | 10/2002 | Oliver | 463/25 |
| 6,500,068 | B2 | 12/2002 | Walker et al. | 463/25 |
| 6,530,835 | B1 | 3/2003 | Walker et al. | |
| 6,537,150 | B1 | 3/2003 | Luciano et al. | |
| 6,544,121 | B2 * | 4/2003 | DeWeese et al. | 463/30 |
| 6,582,306 | B1 | 6/2003 | Kaminkow | |
| 6,582,310 | B1 | 6/2003 | Walker et al. | 463/42 |
| 6,585,592 | B1 | 7/2003 | Crumby | |
| 6,592,457 | B1 | 7/2003 | Frohm et al. | 463/16 |
| 6,605,002 | B2 | 8/2003 | Baerlocher | |
| 6,629,890 | B2 | 10/2003 | Johnson | 463/25 |
| 6,676,517 | B2 | 1/2004 | Beavers | 463/25 |
| 6,702,667 | B2 | 3/2004 | Mattice et al. | |
| 6,726,563 | B1 | 4/2004 | Baerlocher et al. | |
| 6,729,955 | B2 | 5/2004 | Bennett et al. | 463/20 |
| 6,776,711 | B1 | 8/2004 | Baerlocher | |
| 6,786,824 | B2 | 9/2004 | Cannon | 463/42 |
| 6,801,261 | B1 | 10/2004 | Haynes | 348/553 |
| 6,811,482 | B2 | 11/2004 | Letovsky | 463/7 |
| 6,835,132 | B2 | 12/2004 | Bennett et al. | 463/16 |
| 6,855,054 | B2 | 2/2005 | White et al. | |
| 6,875,106 | B2 | 4/2005 | Weiss et al. | |
| 6,884,168 | B2 | 4/2005 | Wood et al. | |
| 6,889,979 | B2 | 5/2005 | Blaha et al. | 273/149 |
| 6,893,341 | B2 | 5/2005 | Walker et al. | |
| 6,918,834 | B2 | 7/2005 | Vancura | |
| 6,923,718 | B2 | 8/2005 | Brossard | 463/30 |
| 6,970,859 | B1 | 11/2005 | Brechner et al. | 707/3 |
| 7,001,278 | B2 | 2/2006 | Maya et al. | |
| 7,011,309 | B2 | 3/2006 | Soltys et al. | 273/149 |
| 7,016,876 | B1 | 3/2006 | Lanier et al. | 705/45 |
| 7,029,009 | B2 | 4/2006 | Grauzer et al. | 273/149 |
| 7,101,282 | B2 | 9/2006 | Walker et al. | |
| 7,198,572 | B2 | 4/2007 | Walker et al. | |
| 7,241,219 | B2 | 7/2007 | Walker et al. | |
| 7,329,187 | B1 | 2/2008 | Holch et al. | |
| 7,467,999 | B2 | 12/2008 | Walker et al. | |
| 7,548,242 | B1 * | 6/2009 | Hughes et al. | 345/473 |
| 7,559,838 | B2 * | 7/2009 | Walker et al. | 463/21 |
| 7,867,074 | B2 * | 1/2011 | Gerrard et al. | 463/16 |
| 2001/0049298 | A1 * | 12/2001 | Bennett | 463/16 |
| 2002/0016201 | A1 * | 2/2002 | Bennett et al. | 463/25 |
| 2002/0034980 | A1 | 3/2002 | Lemmons et al. | 463/40 |
| 2002/0065131 | A1 | 5/2002 | Seelig et al. | |
| 2002/0111210 | A1 | 8/2002 | Luciano, Jr. et al. | 463/29 |
| 2002/0123376 | A1 | 9/2002 | Walker et al. | 463/11 |
| 2002/0147042 | A1 | 10/2002 | Vuong et al. | 463/40 |
| 2002/0175466 | A1 | 11/2002 | Loose et al. | |
| 2003/0003997 | A1 | 1/2003 | Vuong et al. | 463/42 |
| 2003/0008698 | A1 | 1/2003 | Stone | |
| 2003/0032470 | A1 | 2/2003 | Weiss et al. | |
| 2003/0050108 | A1 | 3/2003 | Gauselmann | |
| 2003/0060275 | A1 | 3/2003 | Hughs-Baird | 463/25 |
| 2003/0066089 | A1 | 4/2003 | Andersen | 725/112 |
| 2003/0211881 | A1 * | 11/2003 | Walker et al. | 463/20 |
| 2004/0005918 | A1 | 1/2004 | Walker et al. | |
| 2004/0014524 | A1 * | 1/2004 | Pearlman | 463/30 |
| 2004/0097280 | A1 | 5/2004 | Gauselmann | |
| 2004/0166942 | A1 | 8/2004 | Muir | |

| | | | | |
|---|---|---|---|---|
| 2004/0207156 | A1 | 10/2004 | Soltys et al. | 273/292 |
| 2004/0212214 | A1 | 10/2004 | Spresny | 273/292 |
| 2005/0026680 | A1 | 2/2005 | Gururajan | 463/25 |
| 2005/0026681 | A1 | 2/2005 | Grauzer et al. | 463/29 |
| 2005/0026682 | A1 | 2/2005 | Grauzer et al. | 463/29 |
| 2005/0051955 | A1 | 3/2005 | Schubert et al. | 273/149 |
| 2005/0051965 | A1 | 3/2005 | Gururajan | 273/292 |
| 2005/0054408 | A1 | 3/2005 | Steil et al. | 463/11 |
| 2005/0062226 | A1 | 3/2005 | Schubert et al. | 273/149 |
| 2005/0062227 | A1 | 3/2005 | Grauzer et al. | 273/149 |
| 2005/0096125 | A1* | 5/2005 | LeMay et al. | 463/25 |
| 2005/0113166 | A1 | 5/2005 | Grauzer et al. | 463/11 |
| 2005/0176498 | A1* | 8/2005 | Nguyen | 463/25 |
| 2005/0242500 | A1 | 11/2005 | Downs, III | 273/149 |
| 2005/0245307 | A1* | 11/2005 | Gatto et al. | 463/16 |
| 2006/0003830 | A1 | 1/2006 | Walker et al. | |
| 2006/0063577 | A1 | 3/2006 | Downs, III et al. | 463/11 |
| 2006/0076401 | A1 | 4/2006 | Frerking | 235/380 |
| 2006/0077036 | A1 | 4/2006 | Roemerman et al. | 340/561 |
| 2006/0281516 | A1* | 12/2006 | Duhamel et al. | 463/16 |
| 2006/0287068 | A1 | 12/2006 | Walker et al. | |
| 2007/0010315 | A1* | 1/2007 | Hein | 463/20 |
| 2007/0060252 | A1* | 3/2007 | Taylor | 463/16 |
| 2007/0129131 | A1 | 6/2007 | Kaminkow et al. | |
| 2008/0064489 | A1* | 3/2008 | Seelig et al. | 463/25 |
| 2008/0076503 | A1* | 3/2008 | Mattice et al. | 463/16 |
| 2008/0096639 | A1* | 4/2008 | Okada | 463/20 |
| 2008/0102934 | A1* | 5/2008 | Tan | 463/25 |
| 2009/0088252 | A1* | 4/2009 | Nicely et al. | 463/42 |
| 2009/0305765 | A1* | 12/2009 | Walker et al. | 463/20 |
| 2010/0016055 | A1* | 1/2010 | Englman | 463/20 |
| 2010/0137045 | A2* | 6/2010 | Angelopoulos | 463/1 |

FOREIGN PATENT DOCUMENTS

| | | | |
|---|---|---|---|
| WO | WO 95/30944 | | 11/1995 |
| WO | WO 01/70355 | A1 | 9/2001 |
| WO | WO 02/62437 | A2 | 2/2002 |
| WO | WO 02/24288 | | 3/2002 |
| WO | WO 03/060846 | A2 | 7/2003 |
| WO | WO2006/002194 | | 1/2006 |

OTHER PUBLICATIONS

Regan, Jim, "Winning At Slot Machines", A Guide To Making Money At The Most Popular Of All Casino Games, Carol Publishing Group Edition, 1997.
Office Action for U.S. Appl. No. 10/395,621, dated Oct. 6, 2006, 9 pages.
Office Action for U.S. Appl. No. 10/395,621 dated May 3, 2007, 17 pages.
Notice of Allowance for U.S. Appl. No. 10/328,116 dated Mar. 31, 2008, 7pp.
Notice of Allowance for U.S. Appl. No. 10/328,116 dated Sep. 7, 2007, 9pp.
Office Action for U.S. Appl. No. 10/328,116 dated Mar. 22, 2007, 16 pp.
Office Action for U.S. Appl. No. 10/328,116 dated Oct. 3, 2006, 10pp.
International Search Report for Serial No. PCT/US03-08729 dated Jul. 24, 2003, 3pp.
Sanders, Peter, "Casinos Bet on Radio-ID Gambling Chips", The Wall Street Journal, May 13, 2005, 3 pp.
Gibert, Alorie "Vegas Casino Bets on RFID",CNET News.com, Feb. 9, 2006, 3 pp.
Stutz, Howard "Problem Gambling Help Seen", Las Vegas Review-Journal, Dec. 7, 2005, 2 pp.
Progressive Gaming ITS, Intelligent Table Systems, download date Mar. 6, 2006, 2 pp.
Bloodhound, Shuffle Master, Inc., www.shufflemaster.com/02_eu_products/utility_products/its/bloodhound.asp, download date Apr. 25, 2006, 1 pp.
Nowatzki, Nadine R. and Williams, Robert J. Casino Self-Exclusion Programmes: A Review of the Issues, International Gambling Studies, Jul. 2002, vol. 2, 18 pp.
Beyer, Andrew, "Tracks Without Horses; Teletrack Has Drawbacks; Opening Day At Teletrack", The Washington Post, Oct. 25, 1979, Section: Sports, F1.
Milbert, Neil, "Win, Place, Showtime Teletrack Theatre is a Hit in Connecticut", Chicago Tribune, Jun. 26, 1987, Section: Sports, p. 1, Zone: C.
"Strategy Analytics: Enhanced TV and Interactive Games to Dominate $1.8 Billion Interactive TV Market; 72 Million Europeans Have Access to Interactive TV", Business Wire, Sep. 10, 2002.
Shah, Rawn, "Suggestions for Information Kiosk Systems using the World Wide Web", The World Wide Web Information Kiosks Special Interest Group, Apr. 30, 1994.
Christiansen, Eugene Martin, "Gaming and entertainment—an imperfect union?", Cornell Hotel & Restaurant Administration Quarterly, Apr. 1995, Section: vol. 36, No. 2, p. 79, ISSN: 0010-8804.
"Takasago Denki to offer Video-On-Demand Game Machines", COMLINE Daily News Computers, Apr. 4, 1995.
Schafer, Sarah, "Street Cruising", Technology Inc., 1996, No. 2, p. 19, Ref. No. 16960191.
Roger, Dennis, "tpNet ready to help in the hunt for NZ products", The Press, Jul. 23, 1996, Section: Features, Computers, p. 24, Computers & Business Technology.
Evenson, Laura, "Back in the Game Nolan Bushnell, creator of Atari and 'Pong' has come up with TeamNet and TouchN", The San Francisco Chronicle, Aug. 23, 1996, Section: Daily Datebook, p. D1.
Miller, Donald, "Terminal is set up for public use", Santa Cruz Sentinel, Sep. 29, 1996, Section: p. D1.
Denton, Nicholas, "British Telcom launches public online booths", The Financial Post, Oct. 29, 1996, Section: Section 1, News, p. 10.
"Internet pub scorns the café 'anoraks'", The Herald, Dec. 2, 1996, Section: p. 4.
Bueschel, Richard, "The Encyclopedia of Pinball vol. 1", Jan. 1997.
Price, Stuart, "Connected: Kiosks get off to a slow start Technology BT's touch-screen information points have to clear a cultural hurdle", The Daily Telegraph, Feb. 4, 1997, Section p. 06.
Website: "Net Access Inc. Home page", (http www netaccessinc com/index htm), download date: Feb. 27, 1997.
Website: "The Public Access Coin Operated Internet Browser", (http //embed com: 80/coinet htm), download date: Feb. 27, 1997.
"The Internet Goes Mainstream", RePlay Magazine, Mar. 1997, pp. 179-183.

* cited by examiner

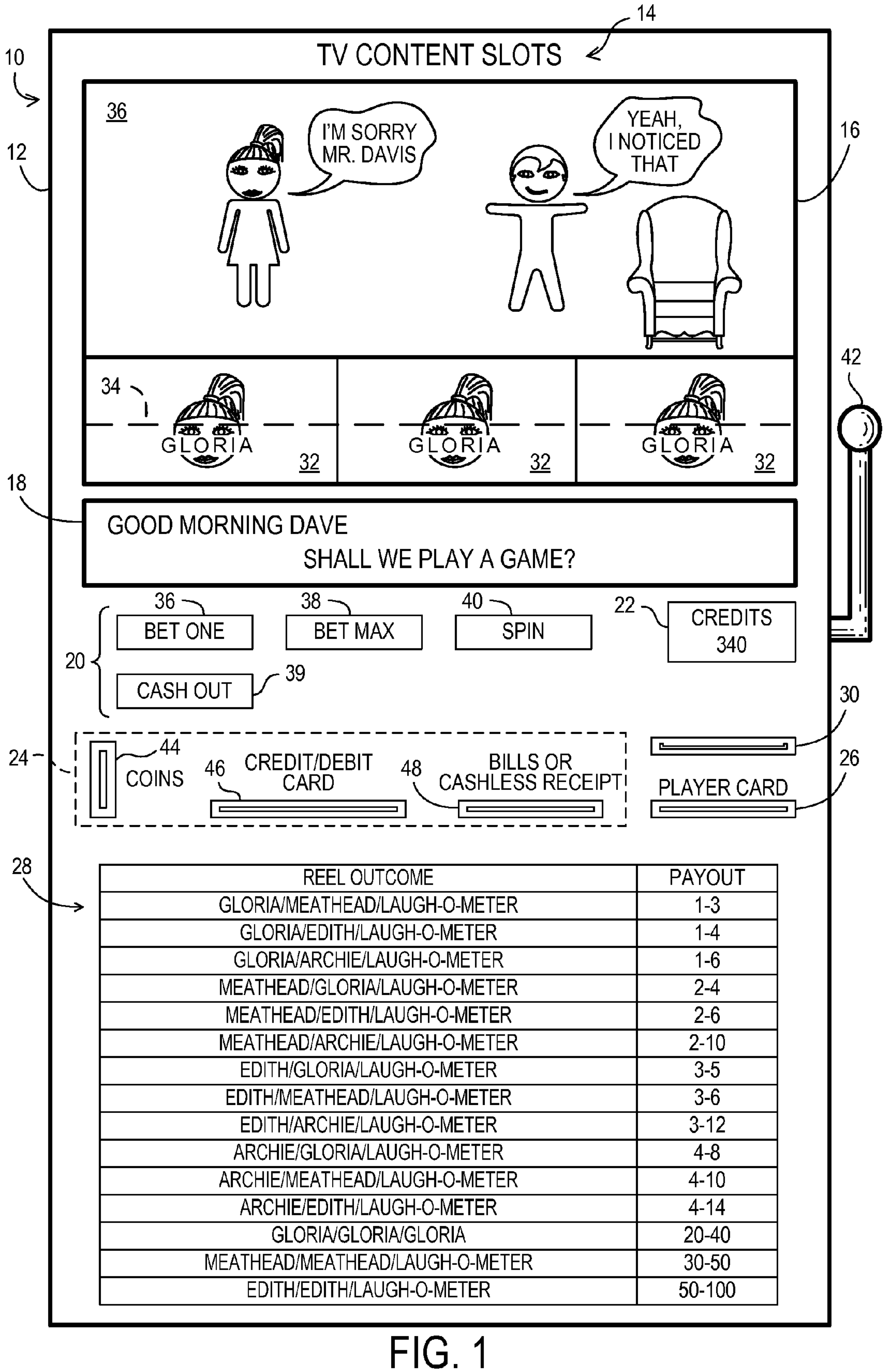

| REEL OUTCOME | PAYOUT |
|---|---|
| GLORIA/MEATHEAD/LAUGH-O-METER | 1-3 |
| GLORIA/EDITH/LAUGH-O-METER | 1-4 |
| GLORIA/ARCHIE/LAUGH-O-METER | 1-6 |
| MEATHEAD/GLORIA/LAUGH-O-METER | 2-4 |
| MEATHEAD/EDITH/LAUGH-O-METER | 2-6 |
| MEATHEAD/ARCHIE/LAUGH-O-METER | 2-10 |
| EDITH/GLORIA/LAUGH-O-METER | 3-5 |
| EDITH/MEATHEAD/LAUGH-O-METER | 3-6 |
| EDITH/ARCHIE/LAUGH-O-METER | 3-12 |
| ARCHIE/GLORIA/LAUGH-O-METER | 4-8 |
| ARCHIE/MEATHEAD/LAUGH-O-METER | 4-10 |
| ARCHIE/EDITH/LAUGH-O-METER | 4-14 |
| GLORIA/GLORIA/GLORIA | 20-40 |
| MEATHEAD/MEATHEAD/LAUGH-O-METER | 30-50 |
| EDITH/EDITH/LAUGH-O-METER | 50-100 |

FIG. 1

150

| RANDOM NUMBER (152) | REEL OUTCOME (154) | AUDIOVISUAL CLIP (156) | PAYOUT RANGE (158) | PAYOUT (160) |
|---|---|---|---|---|
| 1 | EDITH-ARCHIE-GLORIA | N/A | 0 | 0 |
| 2 | EDITH-ARCHIE-MEATHEAD | N/A | 0 | 0 |
| 3 | EDITH-ARCHIE-EDITH | N/A | 0 | 0 |
| 4 | EDITH-EDITH-GLORIA | N/A | 0 | 0 |
| 5 | EDITH-EDITH-ARCHIE | N/A | 0 | 0 |
| 6 | EDITH-EDITH-MEATHEAD | N/A | 0 | 0 |
| 7 | EDITH-EDITH-EDITH | N/A | 0 | 0 |
| . . . | | | | |
| 101 | EDITH-ARCHIE-LAUGH-O-METER | EDITHARCHIE1.MPEG | 3-12 | 3 |
| 102 | EDITH-ARCHIE-LAUGH-O-METER | EDITHARCHIE2.MPEG | 3-12 | 3 |
| 103 | EDITH-ARCHIE-LAUGH-O-METER | EDITHARCHIE3.MPEG | 3-12 | 4 |
| 104 | EDITH-ARCHIE-LAUGH-O-METER | EDITHARCHIE4.MPEG | 3-12 | 6 |
| 105 | EDITH-ARCHIE-LAUGH-O-METER | EDITHARCHIE5.MPEG | 3-12 | 9 |
| 106 | EDITH-ARCHIE-LAUGH-O-METER | EDITHARCHIE6.MPEG | 3-12 | 12 |
| . . . | | | | |
| 211 | ARCHIE-ARCHIE-LAUGH-O-METER | ARCHIE1.MPEG | 100-1000 | 100 |
| 212 | ARCHIE-ARCHIE-LAUGH-O-METER | ARCHIE2.MPEG | 100-1000 | 100 |
| 213 | ARCHIE-ARCHIE-LAUGH-O-METER | ARCHIE3.MPEG | 100-1000 | 150 |
| 214 | ARCHIE-ARCHIE-LAUGH-O-METER | ARCHIE4.MPEG | 100-1000 | 200 |
| 215 | ARCHIE-ARCHIE-LAUGH-O-METER | ARCHIE5.MPEG | 100-1000 | 500 |
| 216 | ARCHIE-ARCHIE-LAUGH-O-METER | ARCHIE6.MPEG | 100-1000 | 1000 |

FIG. 6

162

| FIRST RANDOM NUMBER (164) | REEL OUTCOME (166) | PAYOUT RANGE (168) |
|---|---|---|
| 1 | EDITH-ARCHIE-GLORIA | 0 |
| 2 | EDITH-ARCHIE-MEATHEAD | 0 |
| 3 | EDITH-ARCHIE-EDITH | 0 |
| 4 | EDITH-EDITH-GLORIA | 0 |
| 5 | EDITH-EDITH-ARCHIE | 0 |
| 6 | EDITH-EDITH-MEATHEAD | 0 |
| 7 | EDITH-EDITH-EDITH | 0 |
| ... | | |
| 101 | GLORIA-MEATHEAD-LAUGH-O-METER | 1-3 |
| 102 | GLORIA-EDITH-LAUGH-O-METER | 1-4 |
| 103 | GLORIA-ARCHIE-LAUGH-O-METER | 1-6 |
| 104 | MEATHEAD-GLORIA-LAUGH-O-METER | 2-4 |
| 105 | MEATHEAD-EDITH-LAUGH-O-METER | 2-6 |
| 106 | MEATHEAD ARCHIE-LAUGH-O-METER | 2-10 |
| ... | | |
| 211 | EDITH-ARCHIE-LAUGH-O-METER | 3-12 |
| 212 | ARCHIE-MEATHEAD-LAUGH-O-METER | 4-10 |
| 213 | ARCHIE-EDITH-LAUGH-O-METER | 4-14 |
| 214 | GLORIA-GLORIA-GLORIA | 20-40 |
| 215 | MEATHEAD-MEATHEAD-LAUGH-O-METER | 30-50 |
| 216 | ARCHIE-ARCHIE-LAUGH-O-METER | 100-1000 |

FIG. 7

170

| REEL OUTCOME (172) | PAYOUT RANGE (174) | SECOND RANDOM NUMBER (176) | AUDIOVISUAL CLIP (178) | PAYOUT (180) |
|---|---|---|---|---|
| EDITH-ARCHIE-LAUGH-O-METER | 3-12 | 1 | EDITHARCHIE1.MPEG | 3 |
| EDITH-ARCHIE-LAUGH-O-METER | 3-12 | 2 | EDITHARCHIE2.MPEG | 3 |
| EDITH-ARCHIE-LAUGH-O-METER | 3-12 | 3 | EDITHARCHIE3.MPEG | 4 |
| EDITH-ARCHIE-LAUGH-O-METER | 3-12 | 4 | EDITHARCHIE4.MPEG | 6 |
| EDITH-ARCHIE-LAUGH-O-METER | 3-12 | 5 | EDITHARCHIE5.MPEG | 9 |
| EDITH-ARCHIE-LAUGH-O-METER | 3-12 | 6 | EDITHARCHIE6.MPEG | 12 |

FIG. 8

SYSTEM AND METHOD FOR PRESENTING PAYOUT RANGES AND AUDIOVISUAL CLIPS AT A GAMING DEVICE

RELATED APPLICATIONS

The present invention is related to U.S. patent application Ser. No. 10/908,688, filed May 23, 2005, published as U.S. Patent Publication No. 2006/0003830, which is a continuation-in-part application of U.S. patent application Ser. No. 10/417,758, filed Apr. 16, 2003, published as U.S. Patent Publication No. 2004/0005918, which claimed the benefit of U.S. Provisional Patent Application No. 60/373,111, filed Apr. 16, 2002. The '688 patent application also claimed the benefit of and priority to U.S. Provisional Patent Application No. 60/581,558, filed Jun. 21, 2004.

The present invention is also related to U.S. patent application Ser. No. 10/395,529, filed Mar. 21, 2003, now U.S. Pat. No. 7,241,219, which is a continuation-in-part of U.S. Pat. No. 6,582,310, filed Dec. 17, 1999, which is a continuation of U.S. Pat. No. 6,113,495, filed Mar. 12, 1997. The '529 application also claimed the benefit of and priority to U.S. Provisional Patent Application No. 60/374,369, filed Apr. 19, 2002

The present invention is also related to U.S. patent application Ser. No. 10/882,859, filed Jul. 1, 2004, published as U.S. Patent Publication No. 2004/0242304, which is a continuation of U.S. Pat. No. 6,893,341, filed Oct. 16, 2002, which is a continuation of U.S. Pat. No. 6,500,068, filed Mar. 2, 2001, which is a continuation of U.S. Pat. No. 6,234,896, filed Apr. 11, 1997.

The present invention is also related to U.S. patent application Ser. No. 10/328,116 filed Dec. 20, 2002, published as U.S. Patent Publication No. 2003/0220133, which claims the benefit of and priority to U.S. Provisional Application Ser. No. 60/373,751 filed Apr. 18, 2002.

The present application is related to U.S. Pat. Nos. 6,139, 4311; 6,530,835; and 7,101,282.

The present application is also related to U.S. Patent Application Publication Nos. 2003-0211881 and 2006-0287068 as well as U.S. Provisional Patent Application Ser. No. 60/824, 344, filed Sep. 1, 2006 and PCT publication No. WO 2006/ 002194.

The disclosures of all the related applications listed above are hereby incorporated by reference in their entireties.

FIELD OF THE INVENTION

The present invention relates to gaming devices and more particularly to gaming devices that provide audiovisual content to players of the gaming device.

BRIEF DESCRIPTION OF THE DRAWINGS

FIG. 1 illustrates an exemplary gaming device suitable for use with some embodiment;

FIG. 6 illustrates an exemplary database that may be used in at least one embodiment of the present disclosure;

FIGS. 7 & 8 illustrate exemplary complementary databases that may be used in at least one embodiment of the present disclosure;

DETAILED DESCRIPTION OF THE INVENTION

Figure 2:
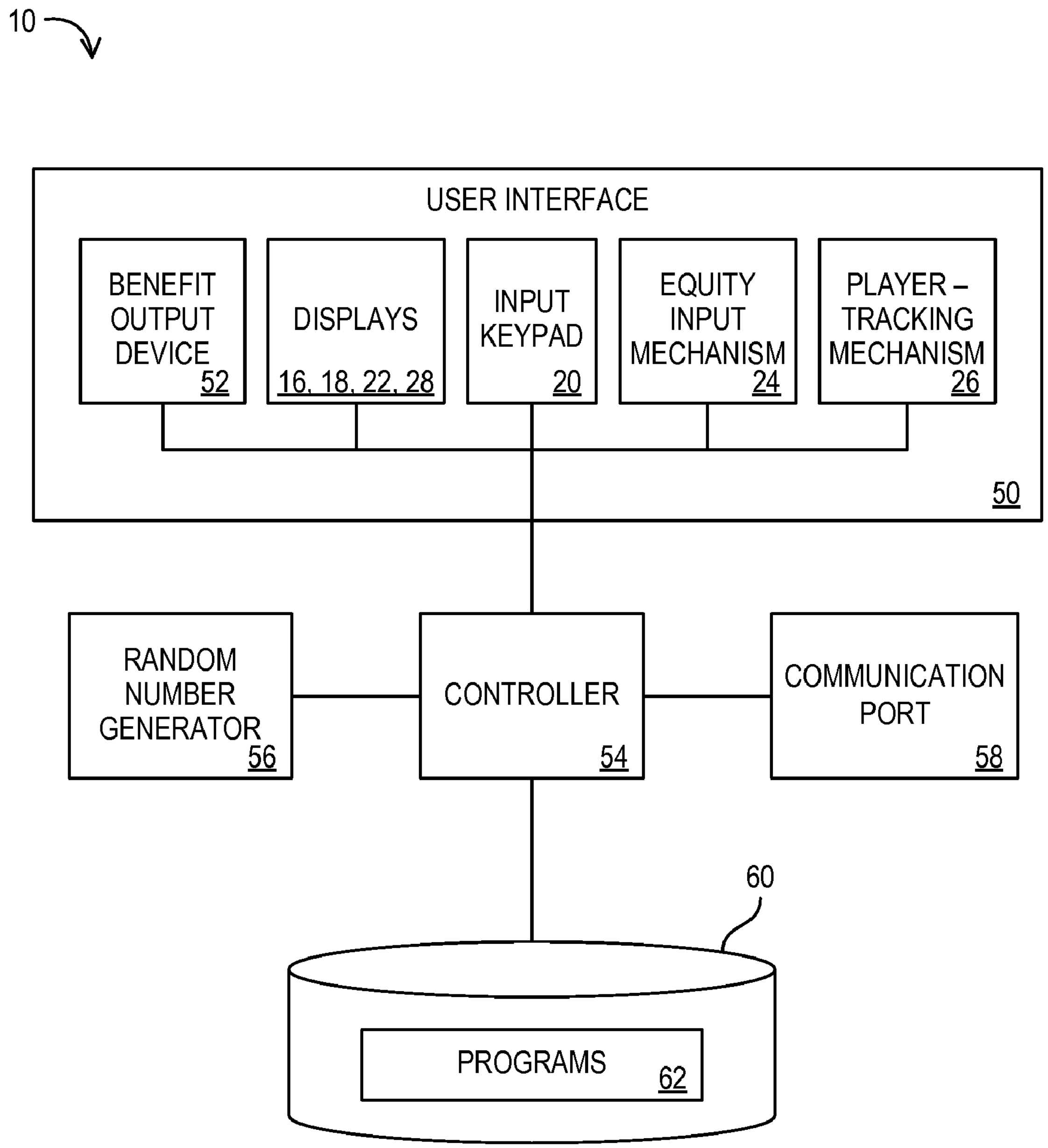
FIG. 2 illustrates a block diagram of an exemplary gaming device suitable for use with some embodiments.

Embodiments disclosed herein contemplate a gaming device that accepts wagers from players and presents a first set of symbols or information to the player in a primary game display. The gaming device further presents a paytable which correlates possible symbol combinations to ranges of possible outcome values. In at least one embodiment, after presentation of the first set of symbols or information, the gaming device presents an audiovisual clip.

It is particularly contemplated that the audiovisual clip contain audiovisual material originally prepared for use in a first context, but which has been repurposed from that use for use in the gaming device. Exemplary repurposed audiovisual clips include television shows, movies, motion pictures, animated television shows, recordings of sporting events, animated movies, and the like. For the purposes of the present disclosure, animations and audiovisual material made specifically for display on a gaming device are excluded from the definition of the term "audiovisual clip".

After, or during, display of the audiovisual clip, the player is informed of the precise value of the outcome value from within the range of possible outcome values. In at least one embodiment, the relative importance of the audiovisual clip may be used to indicate where within the range of possible outcome values the precise outcome value lies. Thus, low value payouts may be associated with insignificant or frequent occurrences within the audiovisual material whereas high value payouts may be associated with infrequent or momentous occurrences within the audiovisual material.

For example, the gaming device may be a television show themed slot machine, and in particular, a slot machine based on ALL IN THE FAMILY™. The symbols on the reels (be they physical reels or video reels) may correspond to characters within the television show such as Gloria, Meathead, Archie, Edith, Lionel, Louise, and the like (of course, it is also contemplated that symbols may correspond to other elements used in the audiovisual clips such as props, objects, settings, words, or phrases spoken by the characters, and the like). These symbols may be interspersed with blanks and filler symbols such as images of fruit, bars, bells, inkblots, couches, dart boards, chairs, and the like. Likewise, range-indicatives such as a Laugh-O-Meter symbol or a symbol that causes entry into a bonus round or progressive jackpot may be mixed in with the character symbols. A player initiates a game start at the gaming device, and the reels spin. The reels may show a set of symbols such as Gloria-Gloria-Gloria. Looking at the paytable, the player sees that Gloria-Gloria-Gloria corresponds to a range of twenty to forty credits. The player is then presented a clip from the television show ALL IN THE FAMILY featuring Gloria. If the precise value is on the high end of the range, a clip showing Gloria and Sammie Davis Jr. might be shown, whereas if the precise value is on the low end of the range, a clip showing Gloria making an excuse for Archie might be shown. In the former case, Sammie Davis Jr. was an infrequent guest of the show, so a clip with him and Gloria is likely to be uncommon. In contrast, Gloria was always apologizing for her father, so such clips are relatively common.

During or after display of the audiovisual clip, a message may appear on the gaming device informing the player of the precise value of the outcome.

Before addressing embodiments of the methodology of the present disclosure, a review of hardware adapted for use with the methods is presented. A discussion of the methodology for some embodiments that may be used on this hardware begins below with reference to FIG. 5.

FIG. 1 illustrates a front elevational view of a gaming device 10, which is, as illustrated, a three-reel video slot machine. The gaming device 10 includes a housing 12 boasting game name indicia 14 and a primary display 16 on which the game action is presented. A secondary display 18 presents images and text to provide supplemental information or instructions to the player as practical or desired. Note that while this disclosure explicitly contemplates certain information being output by one display, it is within the scope of the present disclosure to have different displays output given information.

An input keypad 20 includes a plurality of buttons through which the player may provide input to the gaming device 10. A credit meter 22 displays a current total of credits available to the player. Credits may be established by the player through the use of an equity input mechanism 24 or through game play as will be further described herein.

A player-tracking mechanism 26 may be used to identify a player at the gaming device 10, which, in turn, may allow messages on the secondary display 18 to be personalized, comp points posted to the player profile, and the like. Belly glass paytable display 28 provides a listing of the paytable used by the gaming device 10.

A ticket dispenser 30 may be used to dispense cashless gaming tickets. While only a slot is illustrated, it should be appreciated that a printer and appropriate paper feeding mechanisms are positioned behind the slot as is well understood.

Collectively, the displays 16, 18, 28, input keypad 20, credit meter 22, equity input mechanism 24, player-tracking mechanism 26, and ticket dispenser 30 may be thought of as a user interface 50 (see FIG. 2) for the gaming device.

More particularly, the primary display 16 presents, in this exemplary embodiment, three reels 32 with images and symbols thereon. A payline 34 is illustrated stretching across the images on the reels 32. While only three reels are shown, more or fewer reels may be used if desired. Likewise, while only one payline 34 is illustrated, more paylines may be used if desired. When not actively conducting game play, the gaming device 10 may present an attraction screen or video clip designed to draw attention to the gaming device 10 and entice a player to begin game play on the gaming device 10.

The primary display 16 further includes, in this exemplary embodiment, an audiovisual display area 36. Audiovisual display area 36 is adapted to present audiovisual clips to the player as dictated by the game play of the gaming device 10. In embodiments where the primary display 16 is a glass panel with mechanical reels disposed therebehind, audiovisual display area 36 may be implemented through a separate video monitor positioned as appropriate. It should be appreciated that the audiovisual display area 36 may be repositioned so that it is below, beside, or otherwise oriented relative to the reels 32.

During game play, the reels may be animated to simulate spinning reels and then resolve to show a series of images across the reels. More details on conducting game play are set forth below.

The primary display 16, secondary display 18, the credit meter 22, the belly glass paytable display 28, and the audiovisual display area 36 are "displays" as that term is defined in the Rules of Interpretation set forth below. In an alternate embodiment, the belly glass paytable display 28 is a static display and is merely indicia painted, colored, etched, or otherwise affixed to a glass or polymer panel.

Input keypad 20 may include credit wager buttons 38. The gaming device 10 operates using units of wager as that term is defined in the Rules of Interpretation set forth below. Each credit herein corresponds to a unit of wager. The player may select how many units of wager are to be bet by pressing the corresponding credit wager button 38. In this exemplary embodiment, one credit may be bet by pressing a "bet one" button. Additional units may be wagered through repeated activation of the "bet one" button as is well understood. Alternatively, the player may activate the "bet max" button, which activates maximum wagers for all available paylines. In other embodiments, more or fractional units of wager may be bet by the player as practical or desired.

Input keypad 20 may further include a cash out button 39, which allows players to receive any credits that are currently available as indicated by the credit meter 22. Such cash out buttons 39 are well understood in the industry. Note that input keypad 20 may be actual mechanical buttons or incorporated into a touch screen display as practical or desired.

Input keypad 20 may still further include a start mechanism. In a first embodiment, the start mechanism is a start button 40. In a second embodiment, the start mechanism is a handle 42. While not strictly a button, the handle 42 is, for the purposes of the present disclosure, defined to be part of an input keypad 20. The player initiates a game start by pressing the start button 40 or pulling the handle 42. Other start mechanisms may be used as practical or desired.

The equity input mechanism 24 may include a coin acceptor 44, a magnetic card reader 46, a paper acceptor 48 and/or the like. Magnetic card reader 46 may accept credit, debit or other form of card including a smart card or the like. The paper acceptor 48 may accept bills in appropriate denominations and/or be a cashless gaming receipt acceptor. Players may use any or all the input devices of the equity input mechanism 24 to establish equity in the gaming device 10 and fund wagers. When the player provides such equity, the amount appears on the credit meter 22. In an exemplary embodiment, each credit is equal to a unit of wager. The credit meter 22 reflects the amount of electronic credits currently available to a player for any purpose. A player, for example, may use the electronic credits as wagers for games played on the gaming device 10. The electronic credits may also be "cashed out" as further explained below.

While not shown, the equity input mechanism 24 could include a radio frequency identification (RFID) interrogator that interoperates with a player-controlled transponder (e.g., incorporated into a key fob, a "contactless" player card, or the like). The interrogator could retrieve an account number (e.g., a credit card account, a bank account, a player account, or the like) from the transponder and establish equity therethrough. As yet another alternative, the player may use a cellular phone (or other mobile terminal) and call a number displayed on the gaming device 10. The gaming device 10 may then bill the cellular phone account of the player. As yet another option, the mobile terminal may communicate with the gaming device 10 through some other protocol (e.g., BLUETOOTH™ or WI-FI™) and provide account information to the gaming device 10 such that the account may be billed as practical or desired. A smart card or dongle with an electronic wallet stored thereon, or other similar structure could be used in conjunction with an appropriate dongle port. Still other mechanisms for establishing equity may be used if practical or desired. In place of providing a benefit through the coin hopper or a cashless gaming receipt, funds may be credited to an account that was used to establish equity (e.g., a credit applied to a cellular phone account, direct deposit to a bank, and the like) or other account associated with the player (e.g., such as an account associated with a player-tracking profile).

The player-tracking mechanism 26 may be a magnetic card reader into which the player inserts a magnetic stripe player-tracking card. While illustrated as a magnetic card reader, it should be appreciated that the player-tracking mechanism 26 could be a smart card reader, a bar code reader, a dongle port, or other mechanism such as a wireless interrogator that interrogates a RFID device such as a transponder positioned in a key chain fob or the like. In still another embodiment, the player-tracking mechanism 26 may be a biometric input such as a fingerprint reader, a retinal scanner, or the like. Such inputs may be accompanied by a keypad for PIN entry if practical or desired. Acknowledgement of use of a player-tracking device may be made on the secondary display 18 or other location as practical or desired.

The belly glass paytable display 28 may include a payout schedule including a reel outcome column and a payout column. The payout schedule displays payouts that correspond to various outcomes obtainable on the reels 32. In one or more embodiments, if an outcome on the payline 34 corresponds to a payout as indicated in the display 28, the credit meter 22 may increase the balance displayed by an amount of electronic credits corresponding to the payout. As illustrated, the payout column lists ranges of values obtainable for particular reel outcomes. Thus, for example, if the reels 32 display Gloria-Gloria-Gloria, that game start may have an outcome value of between twenty and forty credits. While the payout schedule is illustrated with all winning reel outcomes being associated with a range of potential values, it should be appreciated that one or more reel outcomes may have a fixed value. Likewise, it possible that the gaming device 10 may operate in two or more modes. In a first mode, all payouts have a fixed value. In a second mode, all payouts have a range of values. In a third mode, payouts are a mix of fixed and ranged values. The gaming device 10 may switch between modes based on input from the player, a server, gaming establishment personnel, or other third party through any appropriate input mechanism as desired. Note further that while the reel outcome column illustrates only completely determined reel sets, partially determined reel sets may also be winners. For example, outcomes such as “Gloria-Gloria-Any” could be a winning outcome. Still further note that the order of the symbols may or may not have an impact on the payout schedule.

In a first embodiment, the belly glass paytable display 28 may persistently present the payout schedule. As noted above, this persistent presentation may be a function of painted glass or the like. Alternatively, the persistent presentation may be on a video monitor. Concerns about screen burn may make this latter option less desirable to some entities, but it remains within the scope of the present disclosure.

In a second embodiment, the belly glass paytable display 28 may intermittently present the payout schedule. The intermittent presentation may be periodic or in response to certain commands issued by the controller 54 or the player. Still other triggering events may cause the presentation of the payout schedule. For example, various activity occurring on the gaming device 10 may trigger output of the payout schedule. Particularly contemplated activities include determination of a “prize-triggering” reel outcome. For example, if the reels resolve to “Edith-Archie-Laugh-O-Meter” then the payout schedule may be presented. For example, once the reels stop spinning, a window may open with the paytable displayed, in effect, explicitly presenting the range of values to the player. As a variation, the entry on the payout schedule corresponding to the displayed reel outcome may be highlighted or emboldened in some manner so as to draw the player’s attention thereto. Such intermittent presentation is well suited for a “display” as that term is defined herein. Between presentations of the payout schedule, other information and/or graphics may be presented if desired.

While the belly glass paytable display 28 is described as being belly glass with the connotation that the display 28 is presented on the “belly” of the gaming device 10 below the primary display 16, it should be appreciated that the display 28 may be repositioned on the gaming device 10 or positioned in a peripheral device and still fall within the scope of the present disclosure.

The player may cash out by pressing the cash out button 39. In such a circumstance, the ticket dispenser 30 may print a ticket which lists a cash value for the credits that had been displayed on the credit meter 22. Thus, for a quarter denomination slot machine, the ticket dispenser would provide a dollar cash value of the number of credits divided by four. Alternatively benefits may be output through a coin hopper (not shown). Both the ticket dispenser 30 and such coin hoppers are well understood in the slot industry.

A block diagram of the gaming device 10 is illustrated in FIG. 2. In particular, the gaming device 10 includes the user interface 50, which includes the displays 16, 18, 22, 28, the input keypad 20, the equity input mechanism 24, the player-tracking mechanism 26, and a benefit output device 52 (e.g., a coin hopper or ticket dispenser 30). The user interface 50 is operatively coupled to a controller 54. The controller 54 may further be operatively coupled to a random number generator 56 and a communication port 58. Memory 60 with programs 62 stored therein is further operatively associated with the controller 54. The elements of the gaming device 10 may communicate over a wirebased bus (not shown explicitly) or wirelessly as practical or desired. The controller 54 with memory 60 and the programs 62 is a control system as that term is defined in the Rules of Interpretation.

Note that while the user interface 50 has been described in terms of discrete buttons and displays, it is possible, as alluded to above, that the buttons of the input keypad 20 may be incorporated into one or more displays through the use of a touch screen. Extending this concept, the touch screen may include menus and active buttons from which a player may select various options relating to her gaming experience. An exemplary option may be supplemental audio played through speakers on the gaming device 10. This option may be selected from a menu. Such menus may be WINDOWS® style drop down menus that appear when a player touches a particular portion of the touch screen, selectively enabled through the actions of the player, or otherwise made available as practical or desired. Once the menu appears, the touch screen may make the menu active such that a player may make a selection from the menu by touching the area of the screen on which the option appears. While a WINDOWS® style menu option is possible, other presentations are also possible. As is readily understood, such a touch screen may require a touch screen controller with the menus stored in appropriate memory devices (e.g., memory 60) associated with the gaming device 10. Likewise, the content that is selected from such menus must be available either locally or remotely so that the gaming device 10 may present such content. In some embodiments, the display of such menus may preempt the display of other information. For example, in one embodiment, the menus may appear on a display 28 and, when the menus are active, the paytable illustrated in FIG. 1 may be obscured by the menus. Other arrangements are also contemplated.

The controller 54 may be positioned within the housing 12 of the gaming device 10. Memory 60 may also be positioned within the housing 12 and may be a computer readable medium as that term is defined in the Rules of Interpretation. The software programs 62 include instructions for making the controller 54 operate. The software programs 62 may be stored in a compressed, uncompiled, and/or encrypted format. The software programs 62 may include program elements that are necessary for operation of the controller 54 such as an operating system, a database management system, device drivers, and the like. The software programs 62 may be uploaded into the memory 60 through any appropriate mechanism such as installation from a floppy, CD, or DVD drive, downloaded from a network through communication port 58, or other mechanism as is well understood. While not explicitly illustrated, memory 60 may store a probability database and/or a payout database. The book "Winning At Slot Machines" by Jim Regan (Carol Publishing Group Edition, 1997) illustrates examples of payout and probability tables and how they may be derived. The entirety of this book is incorporated by reference herein.

The payout database may be, in effect, a paytable database containing the information presented in the display 28 in such a manner that reels 32 may be compared thereto and a benefit for the player determined. Such a paytable database may include an attribute entry defining an attribute, a threshold for the attribute above which the player has qualified for a winning outcome, and a benefit entry which may include a number of credits, comp points, or other value to be awarded to the player. Other arrangements are also possible. Note that the benefit may be a cash value benefit, a comp point, a free game start, an element such as a token redeemable for a free game start, a bonus game start, access to an improved paytable, access to some form of premium play, a ticket to a show, a ticket for a discount at a restaurant, or the like. Note that the premium play may be selected from a menu, which may include forms of insurance, improved paytables, reduced wager requirements, and the like. More information on particularly contemplated databases is presented below with reference to FIGS. 6-8.

Memory 60 may further contain the audiovisual files that are presented in audiovisual display area 36. These audiovisual files may be stored in any appropriate format such as .mpg, .wav, or the like. These audiovisual files may be segments or portions of a full audiovisual program. Alternatively, each file may be a complete program, but indices associated with the audiovisual file may be used to track audiovisual clips that are partial versions of the complete audiovisual file. For example, something analogous to a chapter or scene selection menu for a DVD may be used to identify subportions of the audiovisual file. For more information on storage, maintenance, and use of audiovisual files in a gaming device, the interested reader is referred to U.S. Pat. No. 6,234,896 and U.S. Patent Publication Nos. 2004/0005918 and 2006/0003830, previously incorporated.

The random number generator 56 (as well as any other random number generator described herein), in accordance with at least one embodiment, may generate data representing random or pseudo-random values (referred to as "random numbers" herein). The random number generator 56 may generate a random number every predetermined unit of time (e.g., every second) or in response to an initiation of a game on the gaming device 10. In the former embodiment, the generated random numbers may be used as they are generated (e.g., the random number generated at substantially the time of game initiation is used for that game) and/or stored for future use in the memory 60.

The random number generator 56, as used herein, may be embodied as a processor separate from but working in cooperation with controller 54. Alternatively, the random number generator 56 may be embodied as an algorithm, program component, or software program 62 stored in the memory 60 or other device and used to generate a random number.

Note that, although the generation or obtainment of a random number is described herein as involving the random number generator 56, other methods of determining a random number may be employed. For example, a gaming device owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The communication port 58 may connect the gaming device 10 to a communication network 64 (FIG. 3) through any appropriate communication medium and protocol. An exemplary communication port 58 is an Ethernet port that connects the gaming device 10 to an internet protocol (IP) network.

While not illustrated, some of the components of the gaming device 10 may be embodied as a peripheral device that is operatively associated with the gaming device 10. Such peripheral devices may be mounted on or positioned proximate to the housing 12 of the gaming device 10 as practical or desired. Such peripheral devices may be particularly useful in retrofitting functionality into the gaming device 10. Alternatively, a retrofit package may be assembled including new belly glass and an EEPROM chip that is installed in the memory 60 with the new programs 62 that enable the functionality of one or more embodiments.

Figure 3:
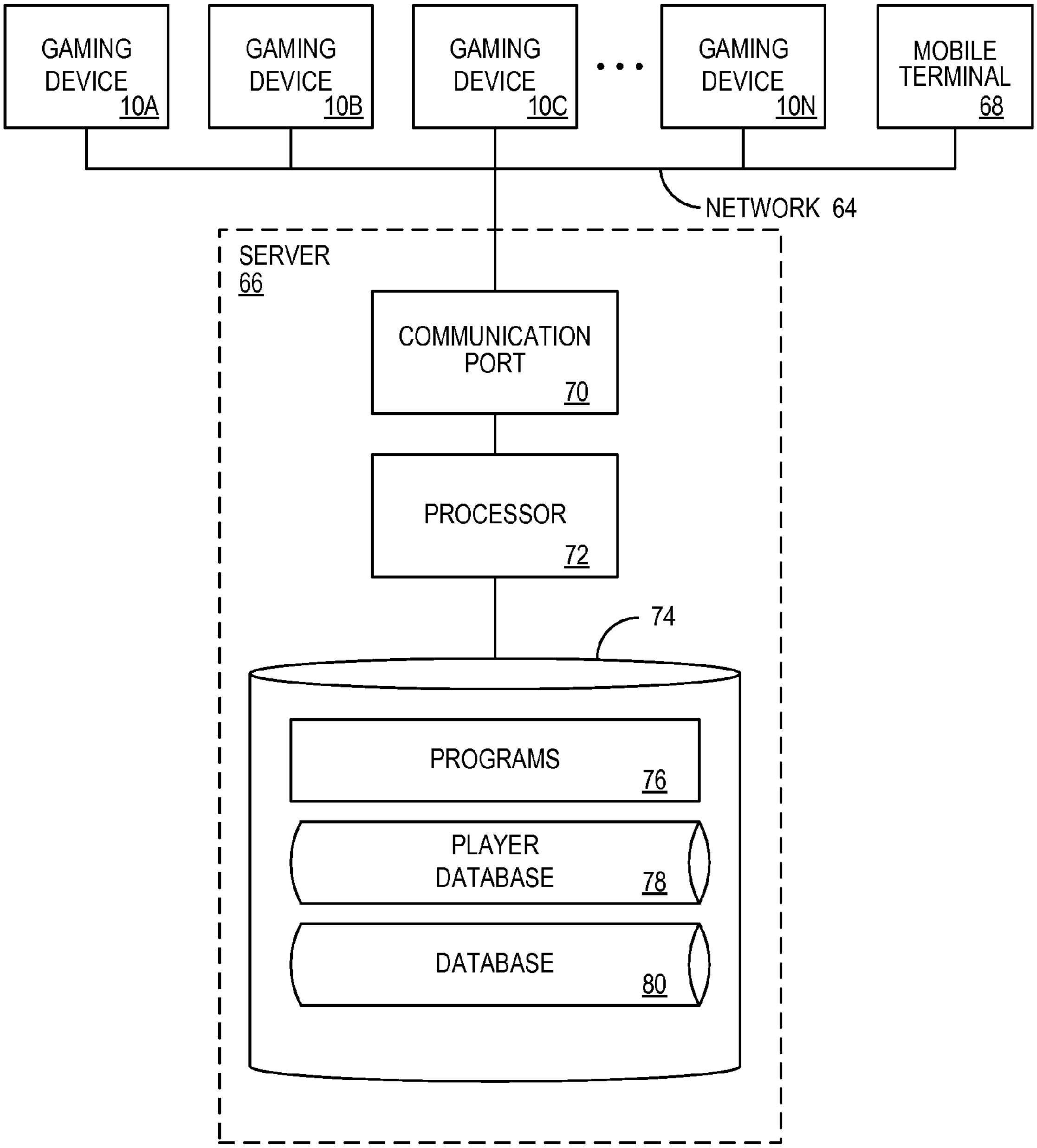
FIG. 3 illustrates a mobile terminal usable as a gaming device according to at least one embodiment.

The gaming device 10 may be a stand-alone device or it may be connected to the network 64 as better illustrated in FIG. 3. For example, gaming devices 10A-10N may be connected through the network 64 to a server 66. Additionally a mobile terminal 68 may be connected to the network 64. More information on the mobile terminal 68 and its operation within the network 64 is provided below with reference to FIG. 4. Network 64 is a network as that term is defined in the Rules of Interpretation.

The server 66 may include a communication port 70 adapted to couple operatively the server 66 to the network 64 and a processor 72. The processor 72 may be operatively coupled to memory 74 with programs 76 stored thereon. A player database 78 and other databases 80 may further be stored on the memory 74 as practical or desired. The processor 72 coupled with the programs 76 is a control system as that term is defined in the Rules of Interpretation.

The server 66 may perform some of the functionality previously attributed to the gaming device 10. That is, the gaming devices 10 may act as client devices for the server 66 with most of the processing and decision making occurring on the server 66. In such an instance, the processor 72 is operatively coupled to the user interface 50 through the network 64 and acts as the control system for the gaming device 10. The memory 74 may store additional databases, including, but not limited to: a game database that stores information regarding one or more games playable on and/or downloadable to one or gaming devices 10, a bundled database that bundles reel symbols with audiovisual clips, and a scheduling and/or configuration database useful for determining which games are to be made available on which gaming devices 10 at what times. Such downloads may be used to switch between modes of operation of the gaming device 10 if desired. In another exemplary embodiment, the audiovisual files may be stored in memory 74 rather than memory 60, and these audiovisual files may be selectively downloaded or streamed to the gaming device 10. In other embodiments, some or all of these functions may be handled by a device distinct from the server 66, but remotely positioned relative to the gaming devices 10.

In place of the payout and probability databases being present in the gaming devices 10, such databases and/or data may instead be stored in the databases 80 of the memory 78. Likewise, the databases may be distributed and/or duplicated between various devices within the network 64.

The programs 76 may allow the server 66 to track gambling, gaming, or other activity performed at the gaming device 10, track gaming or other activities of individual players, instruct a gaming device 10 to perform one or more functions (e.g., output a message to a player, interrupt play, or the like), assign or otherwise determine a unique identifier for a player, and/or control access to stored funds and/or a credit line. In some embodiments the server 66 may be operable to configure a gaming device 10 remotely, update software stored on a gaming device 10, and/or download software or software components to a gaming device 10. For example, the server 66 may be operable to apply a hot fix to software stored on a gaming device 10, modify a payout and/or probability table stored on a gaming device 10, and/or transmit a new version of software and/or a software component to a gaming device 10. The server 66 may be programmed to perform any or all of the above functions as practical or desired and may do so based on, for example, an occurrence of an event (e.g., a scheduled event), receiving an indication from authorized gaming establishment personnel, an authorized third party (e.g., a regulator) and/or receiving a request from a player. In other embodiments, some or all of these functions may be handled by a device distinct from the server 66.

While the previous paragraph describes the server 66 configuring the gaming device 10, it is also possible that the server 66 stores games thereon, and these games are requested from the gaming device 10. The gaming device 10 may be programmed to check periodically if updates are available, and, if an update is available, download and install the update. Alternatively, the gaming device 10 may check on occurrence of an event, an indication from authorized gaming establishment personnel, an indication from an authorized third party, or the like. It is particularly contemplated that the gaming device 10 may be a thin client controlled by the server 66, although such is not required for operation.

Figure 4:
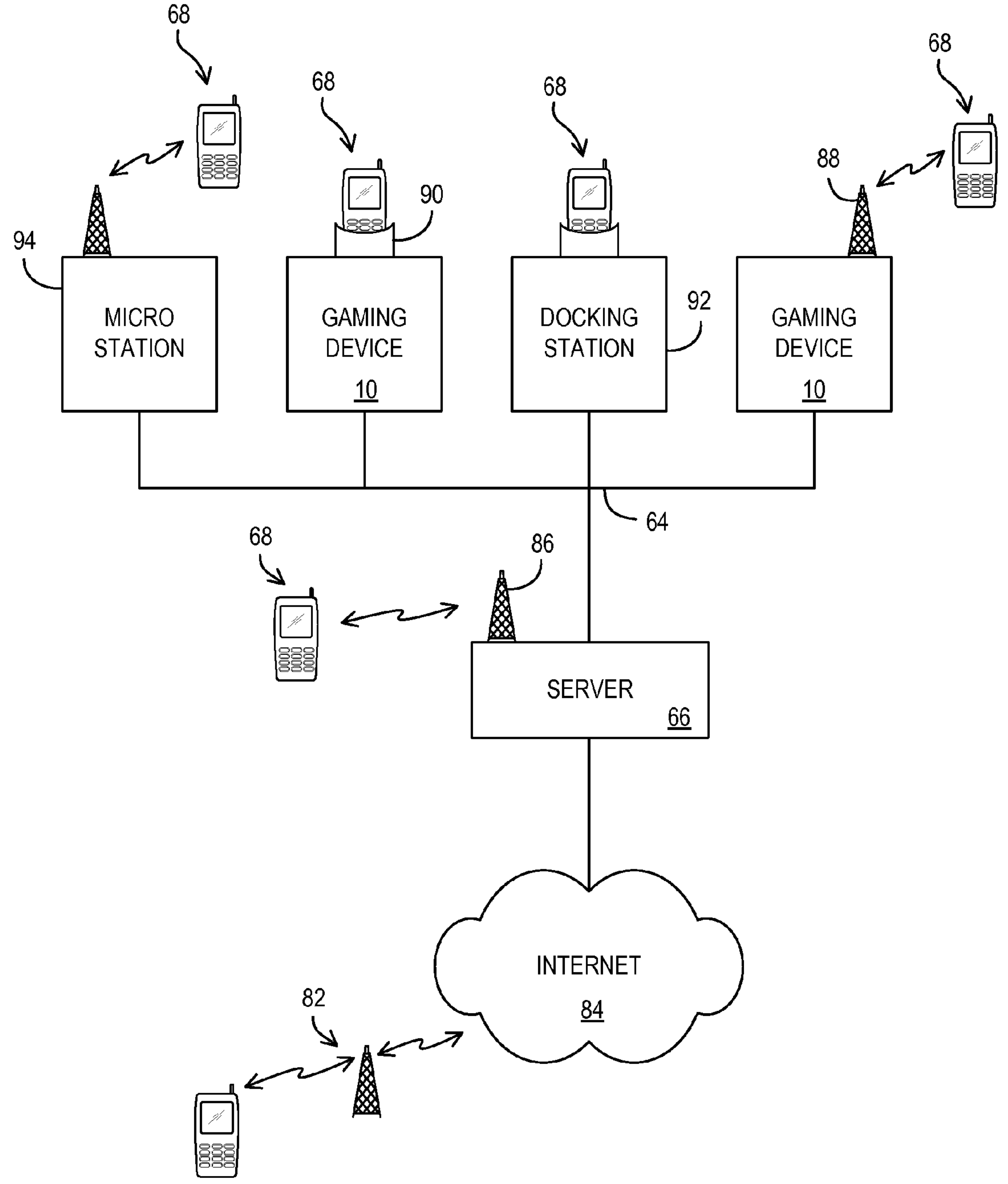
FIG. 4 illustrates a network of gaming devices with a controller according to some embodiments.

In some embodiments, game play may be conducted on a mobile terminal 68 instead of a gaming device 10. FIG. 4 illustrates a variety of techniques through which the mobile terminal 68 may be so used. The illustrated techniques are intended to be exemplary and non-limiting. The mobile terminal 68 may be a cellular telephone, a personal digital assistant (such as a PALM® or BLACKBERRY™ device), a two way pager, a portable computer, a personal computer, a hand-held gaming device (such as a NINTENDO GAMEBOY, the LS800 Tablet PC by Motion Computing Inc of Austin Tex., the iPAQ hw6920 by Hewlett Packard of Palo Alto Calif., or a wireless device marketed by DIAMOND I, INC.), or the like as practical or desired. In short, the mobile terminal 68 may be a device dedicated to gambling or a multipurpose device such as a cellular phone on which games may be played as practical or desired. The mobile terminal 68 includes a user interface including a keypad, microphone, speaker, and display. The mobile terminal 68 further includes a controller or processor with corresponding software stored in a local memory that acts as a control system as that term is defined in the Rules of Interpretation. Alternatively, the user interface of the mobile terminal 68 may be controlled by a remotely positioned control system such as the processor 72.

In one embodiment, the mobile terminal 68 may communicate through a wireless network 82 (e.g., such as the public land mobile network (PLMN)) to the internet 84, and through the internet 84 to an online casino server (not shown explicitly) or other server 66. In such an embodiment, the mobile terminal 68 may be equipped with a web browser (e.g., FIREFOX, MOZILLA, NETSCAPE NAVIGATOR, INTERNET EXPLORER, etc.) to interoperate with the online casino. While the internet 84 is contemplated, the public switched telephone network (PSTN) or other communication network may be used in place thereof as practical or desired. Alternatively, the mobile terminal 68 may download the game from such a server, and the game may be played locally.

As yet another option, the mobile terminal 68 may instead communicate with elements of the network 64. In one embodiment, the mobile terminal 68 communicates with the server 66 through an antenna 86 coupled to the server 66 using an appropriate wireless protocol. In a second embodiment (not shown), the mobile terminal 68 may dock directly with the server 66 using appropriate docking technology. Note that this embodiment may require appropriate security and firewalls since the player will have essentially direct access to the server 66. In another embodiment, the mobile terminal 68 may communicate with a gaming device 10 through an antenna 88. Note that the antenna 88 may be coupled to the gaming device 10 through a peripheral device. In still another embodiment, the mobile terminal 68 may dock with the gaming device 10 through a docking cradle 90. Again, the docking cradle 90 may be incorporated into a peripheral device. In yet another embodiment, a dedicated docking station 92 may be provided, and the mobile terminal 68 may be coupled to the network 64 through the docking station 92. In yet another embodiment, a cellular microstation 94 may be communicatively coupled to the network 64 and the mobile terminal 68 may interoperate with the microstation 94. Other arrangements are also contemplated.

Instead of conducting game play on the mobile terminal 68, the mobile terminal 68 may form part of a user interface. For example, a player may use the display 16 of a gaming device 10, but issue commands related to game play through the mobile terminal 68, or the play may use input keypad 20 to issue commands, but see results on a display of the mobile terminal 68. Again, the mobile terminal 68 may communicate with the gaming device 10 using any appropriate mechanism.

While the discussion above focuses on the gaming device 10 being a video or reeled slot machine, it should be appreciated that the concepts disclosed herein are readily adapted to video poker terminals, video blackjack terminals, video roulette terminals, video keno terminals, video lottery terminals, pachinko terminals, or the like, and all are contemplated within the present disclosure.

Figure 5:
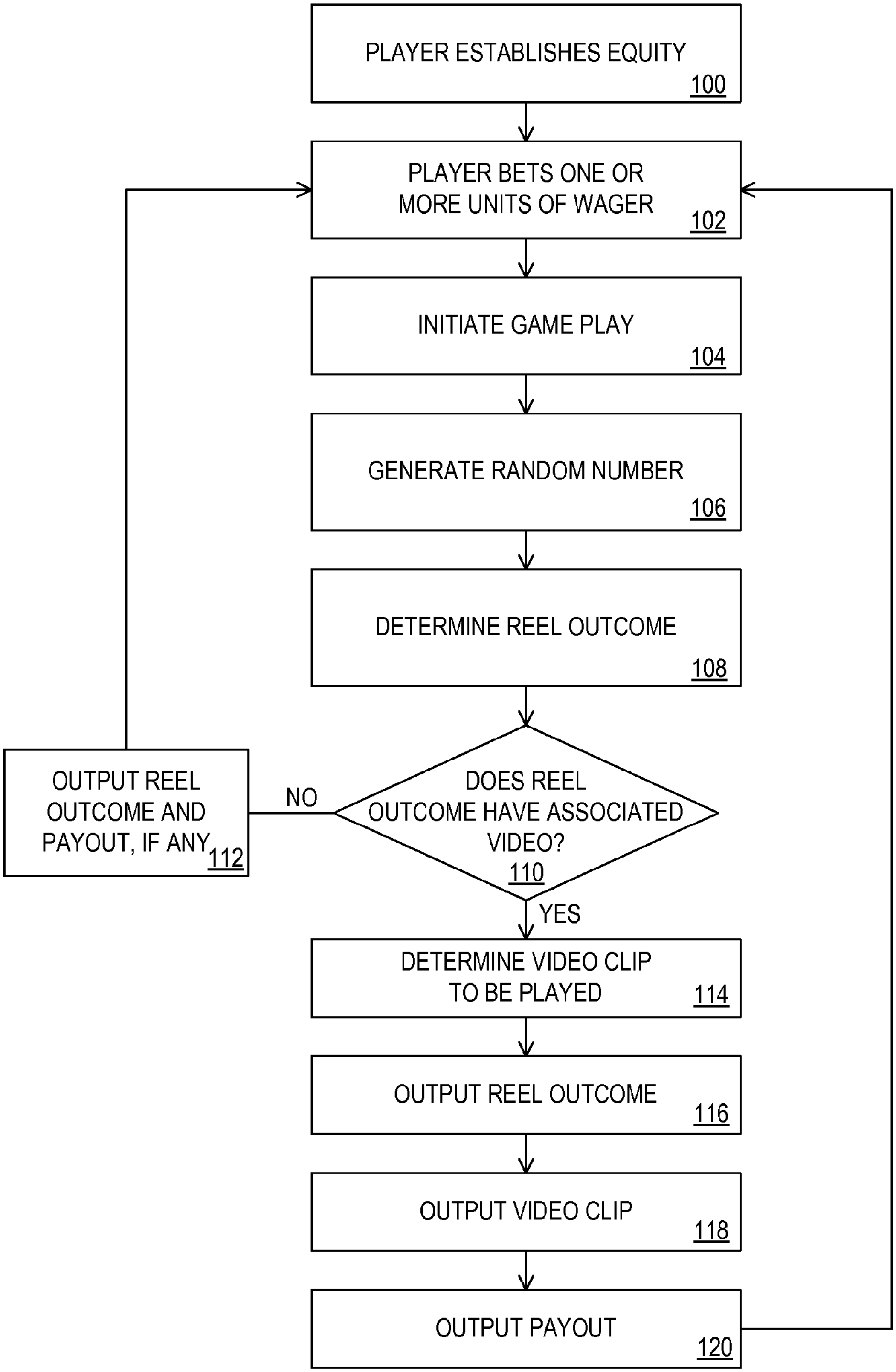
FIG. 5 illustrates a flow chart of an exemplary methodology according to some embodiments.

Against this backdrop of hardware, the present disclosure now turns to exemplary methods of using this hardware. In particular, FIG. 5 illustrates an exemplary embodiment of a method for using the gaming device 10. Initially, a player establishes equity (block 100) through any of the means described above. The player bets one or more units of wager (block 102) through the input keypad 20 and initiates game play (block 104) such as by pulling the handle 42 or pressing the spin button 40.

The control system uses the random number generator 56 to generate a random number (block 106). The control system then uses the generated random number in conjunction with the probability and/or payout databases to determine a reel outcome (block 108). The control system determines if there is an associated audiovisual clip for the reel outcome (block 110).

If there is no associated audiovisual clip, then the gaming device 10 outputs the reel outcome and provides the payout, if any (block 112). The reel outcome may be displayed on display 16 and the payout may be provided by dispensing coins with the benefit output device 52 or by incrementing the credit meter 22 as is well understood. Game play may continue with the player placing wagers and initiating game play as is well understood.

If there is an associated audiovisual clip (i.e., block 110 has been answered affirmatively), then the gaming device 10 determines which audiovisual clip is to be played (block 114). In a first embodiment, the determination of which audiovisual clip is to be played may be merged with the determination of the reel outcome. That is, the random number generated indicates what reel outcome and what audiovisual clip are to be presented. In a second embodiment, the determination of which audiovisual clip is to be played may be a separate step. That is, the random number generated at block 106 determines the reel outcome and sets the range of values within which the final outcome lies. A second random number, generated by the random number generator 56, then determines what actual value within the range of possible values is the final outcome.

The gaming device 10 outputs the reel outcome (block 116) such as through the display 16. In effect, the reel outcome is the first information provided to the player indicative of the outcome. The reel outcome coupled with the information on the payout schedule informs the player that the actual outcome lies within a particular range of values. The gaming device 10 outputs the determined audiovisual clip (block 118). The audiovisual clip is thus second information provided to the player and indicates (albeit sometimes indirectly) an exact amount of the outcome. As noted above, the determination of the audiovisual clip may be done through one or more random numbers. In an exemplary embodiment, the significance of the audiovisual clip may provide an indication as to the size of the payout. That is, more important or less frequent occurrences may be used to show higher value payouts. For example, a winning shot in a basketball game may be used to show a high value payout, whereas a made free throw may show a low value payout.

The gaming device 10 outputs the final payout (block 120). As noted above, the final payout may be output via a benefit output device 52 or added to the credit meter 22.

While the above process has been discussed in terms of the control system of the gaming device 10 performing the methodology, it should be appreciated that where the gaming device 10 is a thin client, the control system of the server 66 may perform these functions. Likewise, in embodiments where functionality is shared between different devices, an appropriate control system may implement the method. Information provided to the player may be through the user interface 50, through the user interface of the mobile terminal 68 or other user interface as desired.

As alluded to above, the control system may use the random number generator 56 and random numbers with a database to determine the reel outcome and the audiovisual clip. An exemplary database is presented in FIG. 6. In particular, FIG. 6 illustrates payout database 150 with random number entries 152, reel outcome entries 154, audiovisual clip entries 156, payout range entries 158, and payout entries 160. Payout database 150 is well suited for the embodiment where a single random number determines the reel outcome, the audiovisual clip, and the final payout.

Random number entries 152 are entries corresponding to numbers output by a random number generator, such as random number generator 56. As such, the control system may receive the random number, look up the random number in the database 150 and use the corresponding entries to make the relevant determinations.

The reel outcome entries 154 list the images on the reels. In the exemplary embodiment illustrated, the gaming device 10 is a three reel slot machine, so three images are listed. The reels 32 will be moved until an appropriate image is presented to the player as is well understood. If the gaming device 10 is a video reel slot machine, then a video file that is the animation for the video reels may be included in this or another reel video file entry (not shown).

The audiovisual clip entries 156 list the appropriate audiovisual clip to be played for the given random number. The payout range entries 158 list the particular ranges within which the payout lies. The payout entries 160 list the actual payout.

If, instead of a single random number being determinative of the reel outcome, the audiovisual clip, and the final payout, two random numbers are used to make the relevant determinations, then two or more databases may be used, exemplary versions of which are illustrated in FIGS. 7 and 8. FIG. 7 illustrates first stage outcome database 162, which includes first random number entries 164, reel outcome entries 166, and payout range entries 168. When the control system receives the first random number, it determines the reel outcome and the payout range through the corresponding entries. Then, the control system uses the second random number with a second stage database 170 (FIG. 8) to determine which audiovisual clip to play and what the final payout is to be.

In an exemplary embodiment, the second stage database 170 may include reel outcome entries 172, payout range entries 174, second random number entries 176, audiovisual clip entries 178, and payout entries 180. There may be a second stage database 170 for each reel outcome that has an associated payout range. Alternatively, these second stage databases 170 may be amalgamated into a single database with appropriate designations to keep the data distinct. As yet another alternative, the first stage outcome database 162 and the second stage databases 170 may be combined into a single database with appropriate designations to keep the data distinct.

As an example, if the first random number is 211, corresponding to a reel outcome of Edith-Archie-Laugh-O-Meter and a payout range of three to twelve credits, the control system then receives the second random number from the random number generator 56 and determines, through second stage database 170, an audiovisual clip and the actual payout. Thus, FIG. 8 notes that for the given Edith-Archie-Laugh-O-Meter reel outcome and the given payout range of three to twelve coins, the second random number will determine which audiovisual clip and which payout are to be provided.

While the databases of FIGS. 6-8 are exemplary tools that may be used to help determine what is to be presented to the player in terms of the reel outcomes, the audiovisual clip and the actual outcome, other tools and techniques may be used as well.

In several locations, the present disclosure has mentioned a "Laugh-O-Meter" symbol. The Laugh-O-Meter symbol, or other comparable symbol, is a symbol that may be used to indicate that a range of payouts are possible for a given reel outcome. That is, in some embodiments, if the range-indicative such as the Laugh-O-Meter is not present, then the reel outcome indicates the actual outcome without obfuscating the actual outcome with a range of values. For example, instead of Gloria-Gloria-Gloria being a range of values as indicated in FIG. 1, Gloria-Gloria-Gloria may always correspond to a payout of thirty coins. However, any time the range-indicative shows up, the player knows that a range of payouts is possible. The other symbols on the other reels 32 provide further indication to identify which particular range of possible payouts is available. In an exemplary embodiment, the presence of the Laugh-O-Meter symbol on the payline 34 is a prize triggering event.

Figure 9:
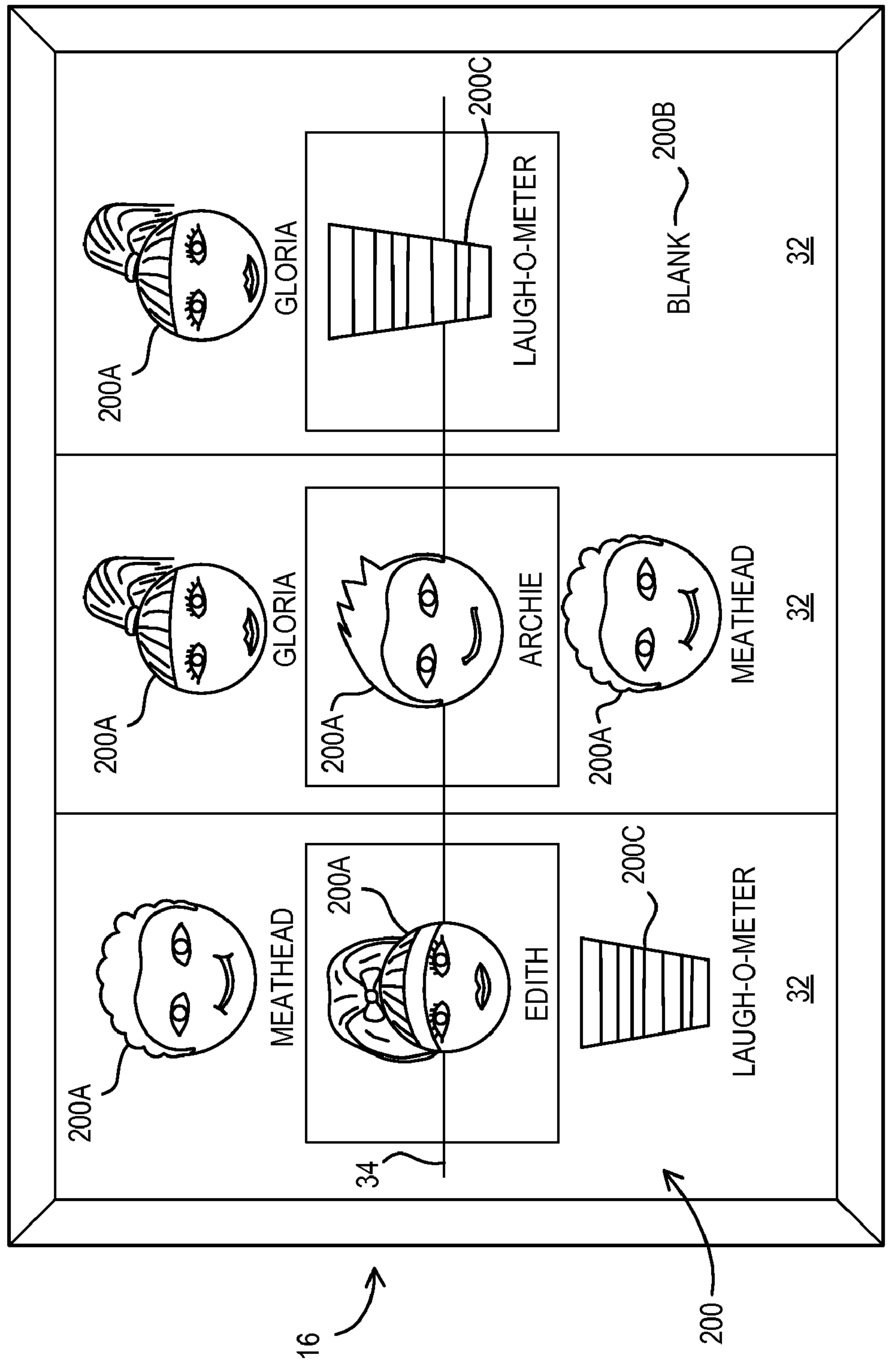
FIG. 9 illustrates an exemplary screen shot of the reels with a range-indicative displayed.

An exemplary screen shot illustrating the Laugh-O-Meter is presented in FIG. 9. In particular, the display 16 includes the three reels 32 each with images 200 disposed thereon. Many of the images 200 are character images 200A or blank images 200B, but some images may be the range-indicatives 200C such as the Laugh-O-Meter symbol.

Figure 10:
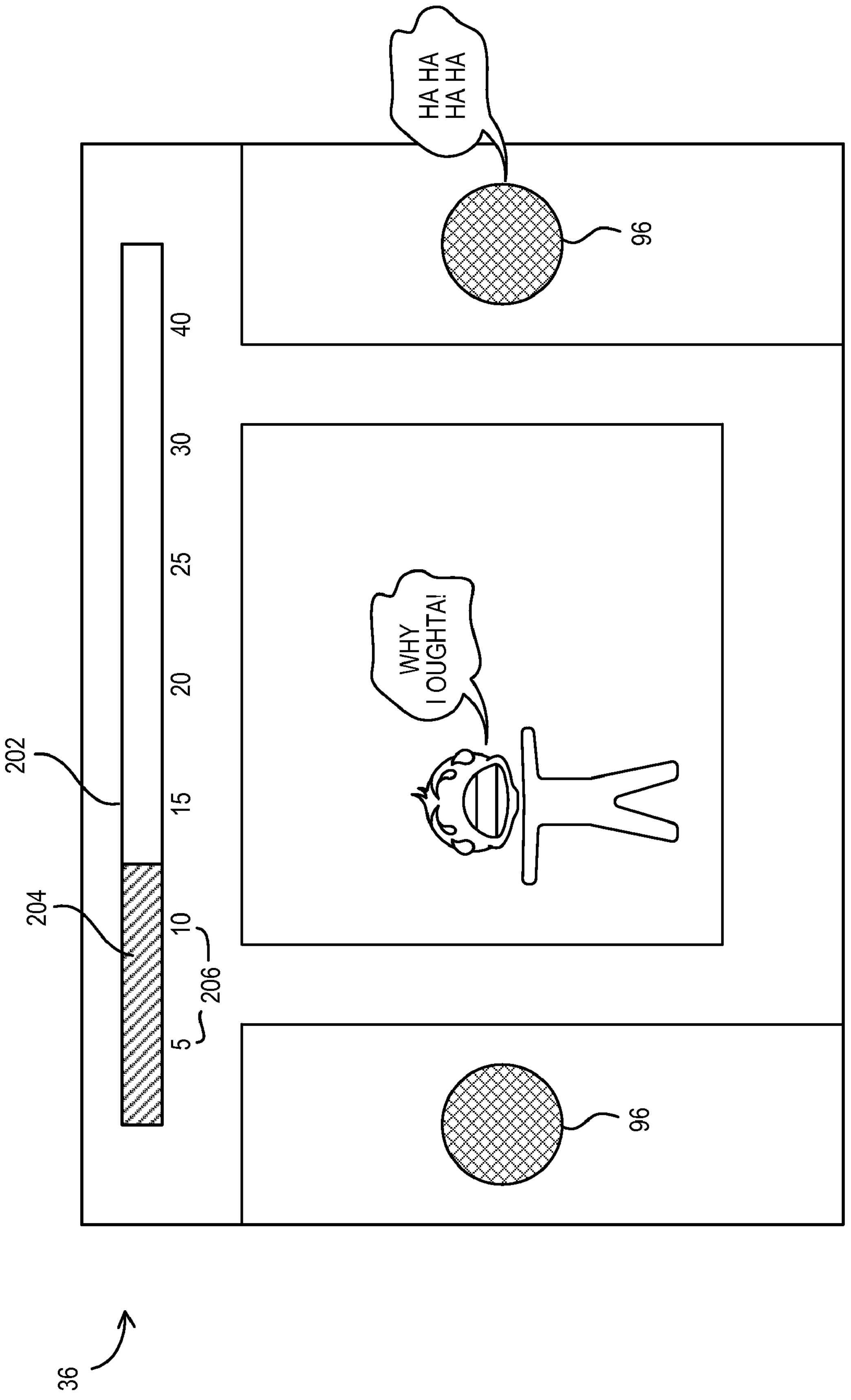
FIG. 10 illustrates an exemplary playback of an audiovisual clip with intimated actual outcome indicia.

The range-indicative 200C may be thematically tied to the audiovisual clip that is presented. For example, the "Laugh-O-Meter" symbol may be tied to the volume of the laugh track that is used in the audiovisual clip that is presented. That is, the more laughter, the higher the payout within the range of possible payouts. This concept is in keeping with the concept that the importance of the clip may be used to hint at the actual value as described above. The range-indicative may be animated in conjunction with the presentation of the audiovisual clip to further highlight this distinction and to give the player a better indication of the actual payout. For example, as illustrated in FIG. 10, the audiovisual clip is being presented in audiovisual display area 36. As the audiovisual clip plays, speakers 96 may provide the audio component including the laugh track associated with the audiovisual clip. As the volume of the laugh track grows, an indicator bar 202 may have a sliding bar 204 grow within the indicator bar 202. Indicia 206 may be indicative of how many credits are to be paid out. In this manner, a player may compare the bar 204 to the indicia 206 and have an idea of the actual payout for the particular audiovisual clip.

Further toward the goal of using the "importance", historical significance or other connotation associated with the audiovisual clip to intimate the final value of the actual payout, the present disclosure contemplates various methods for analyzing audiovisual clips and indexing them based on various metrics. For example, all the words spoken by characters may be tracked (e.g., seventeen occurrences of the word "the", fourteen occurrences of the word "love", etc.), such that a plurality of clips may be index based on such rankings. In another example, various other metrics, such as the number of appearances of particular characters, objects, and the like may be tracked. A paytable may then be derived in association with the plurality of clips based on the index (e.g., clips wherein a particular element occurs/appears frequently are associated with low payouts or losing outcomes, whereas clips indicating "rare" occurrences may be associated with large payouts). Further, in an exemplary embodiment, a large contiguous portion of an audiovisual clip may be "spliced" into clips of smaller lengths based on such analytics/indexing, such that the smaller length clips may be utilized in conjunction with the present disclosure. The present disclosure further contemplates a software application that performs such analytics, indexing, and/or splicing automatically, perhaps with some degree of human involvement (e.g., a human selects a "maximum clip length" value that the application then considers when splicing clips, a human inputs a total number of spliced "nothing" clips during which no tracked events occur, or the like).

Note that while the above discussion has perhaps intimated that each audiovisual clip has a set value, such is not necessarily true. Audiovisual clips may be reused with different values as desired. For example, the same audiovisual clip may be used for Archie-Edith-Laugh-O-Meter and for Edith-Archie-Laugh-O-Meter, but have different payouts in each instance because of the difference in the order of the symbols. Other variations are also within the scope of the present invention.

As an alternate embodiment well suited for use in a video slot machine, the reel outcome and the audiovisual clip may be merged into a single audiovisual file. In this manner, the audiovisual file is played and initially presents the reel outcome. Then, without requiring a new audiovisual file to be loaded, the audiovisual clip is presented. Such an approach may save load times and eliminate delays associated with buffering the audiovisual files.

Rules of Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

A player "wagers" at least a single "unit of wager" to pay for a game start. In many gaming devices, a unit of wager may be referred to as a credit. Many gaming devices allow multiple credits to be wagered concurrently in exchange for an improved paytable or more paylines. A unit of wager may be equivalent to a full dollar amount ($1, $5), a fractional dollar amount, a coin (e.g., $0.05 (nickel) or $0.25 (quarter)), or specified amount of another currency (e.g., a specified number of comp points). Some paytables may be expressed as a number of coins won relative to a number of coins wagered. In such instances, the term coin is the same as a unit of wager. Because gaming devices are embodied in different denominations, it is relevant to note that a coin, credit, or unit of wager on a first device may not be identically valued as a coin, credit, or unit of wager on a second device. For example, a credit on a quarter slot machine (on which the credit is equivalent to $0.25) is not the same as a credit on a five dollar slot machine (on which the credit is equivalent to $5.00). Accordingly, it should be understood that in embodiments in which a player may cash out credits from a first gaming device that operates based on a first denomination (e.g., a quarter-play slot machine) and establish, using only the cashed out credits, a credit balance on a second gaming device that operates based on a second denomination (e.g., a nickel-play slot machine), the player may receive a different number of credits on the second gaming device than the number of credits cashed out at the first gaming device. An interesting discussion of this concept can be found in U.S. Pat. No. 5,277,424, which is hereby incorporated by reference in its entirety.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, LDP, rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as standard definition (SDTV), enhanced definition (EDTV), high definition (HD), or the like. The information may likewise be static, in which case, painted glass may be used to form the display. Note that static information may be presented on a display capable of displaying dynamic information if desired.

The present disclosure frequently refers to a "control system". A control system, as that term is used herein, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, CPU devices, computing devices, microcontrollers, digital signal processors, or like devices. Exemplary processors are the INTEL PENTIUM or AMD ATHLON processors.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, TDMA, CDMA, GSM, EDGE, GPRS, WCDMA, AMPS, D-AMPS, IEEE 802.11 (WI-FI), IEEE 802.3, SAP, SAS™ by IGT, OASIS™ by Aristocrat Technologies, SDS by Bally Gaming and Systems, ATP, TCP/IP, gaming device standard (GDS) published by the Gaming Standards Association of Fremont Calif., the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The present disclosure provides, to one of ordinary skill in the art, an enabling description of several embodiments and/or inventions. Some of these embodiments and/or inventions may not be claimed in the present disclosure, but may nevertheless be claimed in one or more continuing applications that claim the benefit of priority of the present disclosure.

Devices in communication with each other need not be continually transmitting to each other. On the contrary, such computers and devices need only transmit to each other as necessary, and may actually refrain from exchanging data most of the time.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The present disclosure provides, to one of ordinary skill in the art, an enabling description of several embodiments and/or inventions. Some of these embodiments and/or inventions may not be claimed in the present disclosure, but may nevertheless be claimed in one or more continuing applications that claim the benefit of priority of the present disclosure.

What is claimed is:

1. A method comprising:

upon a placement of a wager for a single play of a single game of a gaming device, causing at least one processor to execute a plurality of instructions to randomly determine an outcome for the single play of the single game, said outcome associated with a single award value;

presenting a paytable to a player of the gaming device, said paytable indicative of at least the single award value associated with the randomly determined outcome, wherein the paytable indicates at least a range of award values encompassing the single award value associated with the randomly determined outcome; and presenting information to the player of the gaming device indicating an exact amount of the single award value associated with the randomly determined outcome, wherein the information comprises an audiovisual clip repurposed from its original use for use on the gaming device.

2. The method of claim 1, wherein the paytable comprises at least a plurality of symbols indicative of the range of award values.

3. The method of claim 1, wherein the paytable comprises at least one symbol indicative of the range of award values.

4. The method of claim 1, wherein the gaming device comprises at least one selected from the group consisting of: a slot machine, a video slot machine, and a video poker machine.

5. The method of claim 1, further comprising, upon a placement of a second wager for a second single play of the single game, causing the at least one processor to execute the plurality of instructions to randomly determine a second outcome for the second single play of the single game, said second outcome associated with a second, single award value.

6. The method of claim 1, wherein presenting the paytable comprises presenting the paytable through a fixed medium.

7. The method of claim 1, wherein presenting the paytable comprises presenting the paytable through a monitor.

8. The method of claim 1, wherein the audiovisual clip comprises at least a portion of one selected from the group consisting of: a movie, a sporting event, an animated television show, and an animated movie.

9. The method of claim 1, wherein the audiovisual clip comprises a portion of a television show.

10. The method of claim 1, wherein presenting information comprises presenting the audiovisual clip proximate to a location wherein the paytable was presented.

11. The method of claim 1, further comprising explicitly presenting the range of award values to the player after presenting the paytable and before presenting the information.

12. The method of claim 1, further comprising providing a benefit corresponding to the exact amount to the player.

13. The method of claim 1, wherein presenting the paytable and presenting the information both occur in association with a primary game of the gaming device.

14. The method of claim 1, further comprising causing the at least one processor to execute the plurality of instructions to determine from which of a plurality of groups of audiovisual clips the audiovisual clip is to be selected based at least in part on the paytable.

15. The method of claim 1, which comprises causing the at least one processor to execute the plurality of instructions to initially randomly determine a first random number which is used to present the paytable and causing the at least one processor to execute the plurality of instructions to subsequently randomly determine a second random number which is used to present the information.

16. The method of claim 2, further comprising presenting the paytable correlating the plurality of symbols to the range of award values.

17. The method of claim 3, further comprising presenting the paytable correlating the symbol to the range of award values.

18. The method of claim 5, further comprising providing second information that indicates to the player an exact value for the second, single award value associated with the randomly determined second outcome.

19. The method of claim 6, wherein the fixed medium comprises at least one selected from the group consisting of: a painted glass, a painted polymer, and a colored polymer.

20. The method of claim 9, wherein the presented paytable comprises at least one symbol thematically tied to the television show.

21. The method of claim 20, wherein the presented paytable further indicates at least one character appearing in the audiovisual clip.

22. The method of claim 10, which comprises presenting the paytable on a display screen and presenting the information on the same display screen.

23. A system comprising:

a user interface;

a controller configured to operate with the user interface to:

upon a placement of a wager for a single play of a single game of a gaming device, randomly determine an outcome for the play of the single game, said outcome associated with a single award value;

present a paytable to a player of the gaming device, said paytable indicative of at least the single award value associated with the randomly determined outcome through the user interface, wherein the paytable indicates at least a range of award values encompassing the single award value associated with the randomly determined outcome; and present information to the player of the gaming device through the user interface, the information indicating an exact amount of the single award value associated with the randomly determined outcome, and wherein the information comprises an audiovisual clip repurposed from its original use for use on the gaming device.

24. The system of claim 23, wherein the user interface comprises a mobile terminal.

25. The system of claim 23, wherein the user interface comprises at least one selected from the group consisting of: a slot machine, a video slot machine, and a video poker machine.

26. The system of claim 23, wherein the controller is proximate the user interface.

27. The system of claim 23, wherein the controller is remotely positioned from the user interface.

28. A non-transitory computer readable medium comprising software with instructions to:

upon a placement of a wager for a single play of a single game of a gaming device, randomly determine an outcome for the single play of the single game, said outcome associated with a single award value;

present a paytable to a player of the gaming device, said paytable indicative of at least the single award value associated with the randomly determined outcome, wherein the paytable indicates at least a range of award values encompassing the single award value associated with the randomly determined outcome; and present information to the player of the gaming device indicating an exact amount of the single award value associated with the randomly determined outcome, wherein the information comprises an audiovisual clip repurposed from its original use for use on the gaming device.

29. A method comprising:

after a placement of a wager, receiving, in association with a primary game available for play, an indication from a player of a gaming device to initiate a single play of a single game;

causing at least one display device to present a paytable to the player, said paytable indicative of a plurality of outcomes, wherein each of the outcomes is associated with a range of award values;

causing at least one processor to execute a plurality of instructions to randomly determine a first random number;

causing the at least one processor to execute the plurality of instructions to determine first information to provide to the player of the gaming device based on the first random number;

providing the first information to the player such that the player is informed of one of the ranges of award values;

causing the at least one processor to execute the plurality of instructions to randomly determine a second random number;

causing the at least one processor to execute the plurality of instructions to determine an award value associated with one of the outcomes for the single play of the single game from within the range of award values based on the second random number; and providing an indication of the award value associated with the outcome to the player.

30. The method of claim 29, wherein the gaming device comprises a mobile terminal.

31. The method of claim 29, wherein providing the indication of the award value associated with the outcome to the player comprises presenting an audiovisual clip to the player, wherein the audiovisual clip has been repurposed from its original purpose for use on the gaming device.

32. The method of claim 31, further comprising storing the audiovisual clip.

33. The method of claim 32, wherein storing the audiovisual clip comprises storing the audiovisual clip in memory associated with the gaming device.

34. The method of claim 32, wherein storing the audiovisual clip comprises storing the audiovisual clip in memory associated with a server positioned remotely from the gaming device.

35. The method of claim 31, wherein the audiovisual clip comprises at least a portion of at least one selected from the group consisting of: a movie, a television show, and an animated audiovisual clip.

36. The method of claim 31, wherein the first information is thematically tied to the audiovisual clip.

37. A system comprising:

a user interface; and a controller configured to operate with the user interface to:

after a placement of a wager, receive, in association with a primary game available for play, an indication to initiate a single play of a single game through the user interface from a player of a gaming device;

present a paytable to the player, said paytable indicative of a plurality of outcomes, wherein each of the outcomes is associated with a range of award values;

randomly determine a first random number;

determine first information to provide to the player of the gaming device based on the first random number;

provide the first information to the player such that the player is informed of one of the ranges of award values;

randomly determine a second random number;

determine an award value associated with one of the outcomes for the single play of the single game from within the range of award values based on the second random number; and provide an indication of the award value associated with the outcome to the player.

38. The system of claim 37, wherein the user interface comprises a mobile terminal.

39. The system of claim 37, wherein the user interface comprises at least one selected from the group consisting of: a slot machine, a video slot machine, and a video poker machine.

40. The system of claim 37, wherein the controller is proximate the user interface.

41. The system of claim 37, wherein the controller is remotely positioned from the user interface.

42. A non-transitory computer readable medium comprising software with instructions to:

after a placement of a wager, receive, in association with a primary game available for play, an indication from a player of a gaming device to initiate a single play of a single game;

present a paytable to the player, said paytable indicative of a plurality of outcomes, wherein each of the outcomes is associated with a range of award values;

randomly determine a first random number;

determine first information to provide to the player of the gaming device based on the first random number;

provide the first information to the player such that the player is informed of one of the ranges of award values;

randomly determine a second random number;

determine an award value associated with one of the outcomes for the single play of the single game from within the range of award values based on the second random number; and provide an indication to the player of the award value associated with the outcome.

43. A method comprising:

causing at least one display device to present a paytable to a player, said paytable indicative of a plurality of outcomes, wherein each of the outcomes is associated with a range of outcome values;

upon a placement of a wager for a single play of a single game of a gaming device, causing at least one processor to execute a plurality of instructions to randomly determine a single outcome value for the single play of the single game;

causing the at least one processor to execute the plurality of instructions to determine one of the ranges of outcome values within which the single outcome value lies;

providing an indication of the range of outcome values to the player of the gaming device; and informing the player of the single outcome value through presentation of an audiovisual clip that has been repurposed from its original purpose for use in the gaming device.

44. The method of claim 43, wherein causing the at least one processor to execute the plurality of instructions to determine one of the ranges of outcome values within which the single outcome value lies occurs after causing the at least one processor to execute the plurality of instructions to determine the outcome for the single play of the single game.

45. The method of claim 43, further comprising causing the at least one processor to execute the plurality of instructions to dynamically update the presented paytable on the gaming device as the range of outcome values is determined.

46. The method of claim 43, wherein the gaming device comprises at least one selected from the group consisting of: a slot machine, a video slot machine, and a video poker machine.

47. The method of claim 43, wherein the audiovisual clip comprises at least a portion of at least one selected from the group consisting of: a movie, a television show, and an animated audiovisual clip.

* * * * *

UNITED STATES PATENT AND TRADEMARK OFFICE

CERTIFICATE OF CORRECTION

PATENT NO. : 8,113,935 B2
APPLICATION NO. : 11/684718
DATED : February 14, 2012
INVENTOR(S) : Jay S. Walker et al.

It is certified that error appears in the above-identified patent and that said Letters Patent is hereby corrected as shown below:

In Claim 10, Column 20, Line 39, between "presenting" and "information" insert --the--.

In Claim 17, Column 20, Line 66, between "the" and "symbol" insert --at least one--.

In Claim 18, Column 21, Lines 2 to 3, replace "value for" with --amount of--.

In Claim 23, Column 21, Line 19, after "interface;" insert --and--.

In Claim 23, Column 21, Line 23, between "the" and "play" insert --single--.

In Claim 44, Column 24, Line 25, between "the" and "outcome" insert --single--.

In Claim 44, Column 24, Line 25, between "outcome" and "for" insert --value--.

Signed and Sealed this
Eleventh Day of September, 2012

David J. Kappos

David J. Kappos
*Director of the United States Patent and Trademark Office*